US008821818B1

(12) United States Patent
Davidson

(10) Patent No.: US 8,821,818 B1
(45) Date of Patent: Sep. 2, 2014

(54) CLEANING STACK GAS

(71) Applicant: Three D Stack, LLC, Powell, OH (US)

(72) Inventor: James Gary Davidson, Buchanan, TN (US)

(73) Assignee: Three D Stack, LLC, Powell, OH (US)

( * ) Notice: Subject to any disclaimer, the term of this patent is extended or adjusted under 35 U.S.C. 154(b) by 0 days.

(21) Appl. No.: 13/841,339

(22) Filed: Mar. 15, 2013

(51) Int. Cl.
*B01D 53/50* (2006.01)
*B01D 53/56* (2006.01)
*B01D 53/62* (2006.01)
*B01D 53/82* (2006.01)
*B01D 53/86* (2006.01)
*C05D 9/00* (2006.01)
*C05C 5/00* (2006.01)

(52) U.S. Cl.
CPC ............... *C05C 5/00* (2013.01); *B01D 53/565* (2013.01); *B01D 53/62* (2013.01); *B01D 53/508* (2013.01)
USPC ... 423/210; 423/239.2; 423/230; 423/244.11; 422/168; 422/169; 422/170; 422/177; 422/180; 71/31; 71/54

(58) Field of Classification Search
USPC .......... 423/210, 239.2, 230, 244.11; 422/168, 422/169, 170, 177, 180; 71/31, 54
See application file for complete search history.

(56) References Cited

U.S. PATENT DOCUMENTS

| | | | |
|---|---|---|---|
| 3,895,094 A | 7/1975 | Carter et al. | |
| 4,133,671 A * | 1/1979 | Mikel | ............................... 71/54 |
| 4,297,328 A | 10/1981 | Ritscher et al. | |
| 4,735,930 A | 4/1988 | Gerdes et al. | |
| 4,748,012 A | 5/1988 | Weber et al. | |
| 4,946,659 A | 8/1990 | Held et al. | |
| 5,041,270 A | 8/1991 | Fujitani et al. | |
| 5,041,272 A | 8/1991 | Tamura et al. | |
| 5,085,840 A | 2/1992 | Held et al. | |
| 5,143,707 A | 9/1992 | Beck et al. | |
| 5,160,033 A | 11/1992 | Vassilakis et al. | |
| 5,186,903 A * | 2/1993 | Cornwell | ....................... 422/122 |
| 5,223,237 A * | 6/1993 | Simpson et al. | ......... 423/244.11 |
| 5,270,024 A | 12/1993 | Kasahara et al. | |
| 5,417,949 A | 5/1995 | McWilliams et al. | |
| 5,417,950 A * | 5/1995 | Sheu et al. | .................. 423/239.2 |
| 5,482,692 A | 1/1996 | Audeh et al. | |
| 5,520,895 A | 5/1996 | Sharma et al. | |
| 5,536,483 A | 7/1996 | Descat et al. | |
| 5,589,147 A | 12/1996 | Famos et al. | |
| 5,776,324 A | 7/1998 | Usala | |
| 6,171,556 B1 | 1/2001 | Burk et al. | |
| 6,221,324 B1 | 4/2001 | Coq et al. | |

(Continued)

FOREIGN PATENT DOCUMENTS

DE 4443301 6/1996
EP 0393917 10/1990

(Continued)

*Primary Examiner* — Timothy Vanoy
(74) *Attorney, Agent, or Firm* — Hahn, Loeser & Parks LLP; Arland T. Stein

(57) ABSTRACT

A method and apparatus for cleaning carbon oxides, sulfur oxides and nitrogen oxides, from stack gas, from combustion of coal, combustion of natural gas or propane, or from a cement kiln by reaction using calcium zeolite and sodium zeolite catalysts. The method also includes cleaning the catalytic beds with nitrogen to remove the collected reactants and recover a fertilizer product and the catalysts for reusable.

81 Claims, 9 Drawing Sheets

(56) References Cited

U.S. PATENT DOCUMENTS

| | | | |
|---|---|---|---|
| 6,638,342 B2 * | 10/2003 | Gansley et al. | 95/189 |
| 6,689,709 B1 | 2/2004 | Tran et al. | |
| 6,914,026 B2 | 7/2005 | Tran et al. | |
| 7,118,722 B2 | 10/2006 | Tran et al. | |
| 7,704,475 B2 | 4/2010 | Bull et al. | |
| 7,968,068 B2 | 6/2011 | Bull et al. | |
| 2001/0014304 A1 * | 8/2001 | Satokawa et al. | 423/244.11 |
| 2004/0053773 A1 | 3/2004 | Sarkar et al. | |
| 2004/0109805 A1 | 6/2004 | Schweter et al. | |
| 2007/0157690 A1 * | 7/2007 | Chen et al. | 71/31 |
| 2008/0044331 A1 | 2/2008 | Schweter et al. | |

FOREIGN PATENT DOCUMENTS

| | | | |
|---|---|---|---|
| GB | 2051030 A * | 1/1981 | 71/31 |
| WO | 2004002611 | 1/2004 | |
| WO | 2004047960 | 6/2004 | |

* cited by examiner

CLEANING STACK GAS

BACKGROUND AND SUMMARY

This invention relates to cleaning of stack gases such as those from coal fired power plants, from natural or propane burning heating plants or from cement kilns. The stack gases exhausted from each such facility is controlled by environmental regulations. Such regulations require abatement of carbon monoxide (CO), carbon dioxide ($CO_2$), nitrogen oxide (NOx), sulfur oxide (SOx) as well as halogens such as chloride and fluorides and trace metals particularly, mercury, lead, zinc.

Various methods and apparatus have been proposed for abating these pollutants in stack gases. It is proposed that the stack gases be mixed with ammonia or urea and then passed through a catalyst in which the ammonia reacts selectively with the nitrous oxides to form nitrogen gas in water vapor, or combustion of a sulfur-containing fossil fuel in the presence of a calcium carbonate or magnesium carbonate to form calcium sulfate or magnesium sulfate. See U.S. Pat. Nos. 8,181,451, 7,968,068, 6,706,246, 5,525,317, 5,237,939, 4,185,080, and 4,051,225. Reducing nitrogen in stack gas passing the stack gas through a heat exchange having a SCR catalyst. See U.S. Pat. No. 5,918,555. Reduction of sulfur oxide content in stack gases by catalyzed oxidation to sulfur trioxide in the presence of an absorbent or combusting sulfur-containing fuel in a combustion zone charged with a slurry in sulfuric acid solution. See U.S. Pat. Nos. 5,540,755, 4,649,034, 4,284,015, and 4,185,080. Catalytically converting unburned hydrocarbons and carbon monoxide to carbon dioxide and reducing nitrogen oxides to nitrogen subsequent to the combustion of fossil fuels while absorbing sulfur oxide, where the catalytic material is physically combined onto a dry powder of an adsorbent matrix select from calcium aluminate, calcium aluminate cement, barium titanate, and calcium titanate. See U.S. Pat. No. 4,483,259. It has also been proposed to pass the stack gases through a catalyst bed of a combination of active metals on the surface that is capable of reducing or converting sulfur oxides, carbon monoxide and hydra carbons to inert compounds such as carbon dioxide, water and nitrogen. See U.S. Pat. No. 7,399,458. Levels of mercury in stack gases from coal combustion have also been reduced by introducing a sorbent composition into the gas stream in a zone where temperature is greater than 500° C., where the sorbent composition comprises an effective amount of nitrate salt and/or a nitrite salt. See U.S. Pat. Nos. 7,468,170 and 7,731,781.

These previous proposals had a number of drawbacks. Many require addition of another gas or liquid such as ammonia or sulfuric acid, or the presence of an active metal catalyst. Also, they have involved production of stack gases such as carbon dioxide, which is now itself regulated as pollutant, and production of a waste material which itself presents a disposal problem sometimes as a hazardous waste.

There is still a need for a method and apparatus to effectively remove carbon monoxide, carbon dioxide, nitrous oxides, and sulfur oxides, as well as trace metals such as mercury, from stack gases without consuming expensive catalysts, injection of additional gases and solids, and without creating waste products that do, themselves, present the problems in disposal.

This problem in cleaning of stack gases is of particular concern in coal fire power plants because of the release of volatiles such as coal tar, sulfur oxides, and other active pollutants. These proposals also involve flaring methane gas which could reduced with energy recovery. A variety of methods have been proposed for reducing pollutants released from coal fired power plants. One method of cleaning coal flue gases is the use of scrubbers that inject a liquid or slurry into a gas stream that washes various pollutants, such as acidic compounds, from the flue stream. Another type of cleaning is the use of an exhaust burner that combusts volatile materials and other compounds to reduce pollution. The burner may also burn uncombusted methane present in the exhaust stream. Another type of cleaning that may be used is carbon capture that collects and stores carbon dioxide, such as by compressing the carbon dioxide and storing it in a geological formation. Other types of cleaning flue gases from coal fired plant have also been proposed and are known to those having skill in the art.

Zeolite has also been proposed as a material to absorb carbon dioxide, then to be able to regenerate the zeolite material. See "Carbon Dioxide Capture Using a Zeolite Molecular Seive Sampling System for Isotopic Studies ($^{13}C$ abd $^{14}C$) of Respiration," *Radiocarbon*, 47, 441-451 (2005), "Absorbent Materials for Carbon Dioxide Capture from Large Anthropogenic Point Sources, *ChemSusChem* 2009,2, 796-854, *NIST Provides Octagonal Window of Opportunity for Carbon Capture, NIST Techbeat*, Feb. 7, 2012. However, these uses of zeolite involved large particle sizes of zeolite, for example between 1/32 and 1/16 inch in size in a low pressure to provide for adsorption of carbon dioxide and later regeneration. The effectiveness of these processes have been affected by the presence of moisture.

The presently disclosed method uses more finely ground zeolite as described below to more effectively clean carbon oxides, sulfur oxides and nitrogen oxides from stack gases. The method of cleaning stack gases disclosed comprises the steps of: (a) providing in a stack or flue adapted to pass stack gases a first catalytic flow-through bed of calcium zeolite comprising zeolite particles of a majority between 44 μm and 64 μm in size adapted to reduce carbon oxides from the stack gases, (b) providing in the stack adapted to pass stack gases positioned adjacent the first catalytic flow-through bed, a second catalytic flow-through bed of a blend between 25 and 75% of sodium zeolite and calcium zeolite comprising zeolite particles of a majority between 65 μm and 125 μm in size adapted to reduce nitrogen oxides from the stack gases, (c) providing in the stack adapted to pass stack gas positioned adjacent the second catalytic flow-through bed, a third catalytic flow-through bed of calcium zeolite comprising zeolite particles of a majority between 78 μm and 204 μm adapted to reduce sulfur oxides in the stack gases The method further include passing stack gases selected from the group consisting of volatiles from combustion of coal or from combustion of natural gas or propane or flue gases from a cement kiln sequential through the first catalytic bed, the second catalytic bed, and the third catalytic bed each reducing pollutants and collecting solids in the catalytic beds and providing gas exiting the third catalytic bed with at least 90% reduction in sulfur oxides, nitrogen oxides, and carbon oxide. The particle size ranges of calcium zeolite and the calcium zeolite/sodium zeolite blend is indicative of the surface area, number, of exposed zeolite pores, and ion exchange capacity of the calcium and sodium/calcium zeolite in the catalytic flow-through beds.

The first catalytic flow-through bed, the second catalytic flow-through bed and the third catalytic flow-through bed may be provided between screens of between 150 and 350 mesh. This enables the catalytic beds to contained in position without falling out of the bed, while maintaining the catalytic beds as flow through beds without appropriate pressure drop across each bed. The beds can be maintained in any desired cross section given cross-sectional area of the stack and with a depth corresponding to the flow rate of stack gases through the stack.

The method can be extended by purging solids and liquids from the first catalytic bed, the second catalytic bed, and the third catalytic bed by intermittently passing nitrogen through the beds to remove solids and liquids reaction product formed in the beds from the stack gases. This embodiment enables the solids and liquids collected in the catalytic flow-through beds to be reacted with nitrogen to form nitrate compounds and be recovered as a useable product such as fertilizer. This step of purging the catalytic flow-through beds may be performed by liquid nitrogen to increase the efficiently of the recovery of solids and liquids from the catalytic flow-through beds and make the recovered product more useful as a fertilizer product.

This method also provides a way of removing other such as aluminum oxides, mercury compounds and trace metals such as zinc, lead, uranium and rare earth metals from the stack gas stream. An added benefit of the present method is that methane, which is typically flared and wasted, can be recovered, and moisture typically a problem is reduced as part of the recovered product and taken off as hydrogen and oxygen gas in the cleaned stack gas.

Furthermore, the first catalytic flow-through bed, the second catalytic flow-through bed, and the third catalytic flow-through bed can be provided in a system that allows for continuous reduction and cleaning of stack gas while another part of the same beds or like beds are purged to capture of fertilizer products and other commercial products and clean the beds for reuse. For example, two or more series of beds could be provided in parallel so one series of beds were in use to clean the stack gas while one or more other series of beds was be purged of collected solids and liquids and cleansed for reuses. Another approach is to assemble the beds on rotating disks. This enables the catalytic flow-through beds to be maintained in operation cleaning the stack gases while other parts the same catalytic flow-through bed or a bed of similar composition to be cleaned of collected solids and liquids for reuse. The later approach has the advance of allowing the individual beds to be taken out of use separately as desired, rather than require all beds in a series to be taken off line at once for purging to removing collected solids and liquid and clean for reuse.

In another embodiment, an additional fourth catalytic flow-through bed of calcium zeolite comprising zeolite particles between 44 µm and 64 µm in size may be positioned in the stack gas before the first catalytic bed, with an electrical charge beneath said fourth catalytic flow-through bed to facilitate collection aluminum oxides and other aluminum compounds from from the stack gases before passing through the first catalytic bed. This embodiment enables aluminum compounds to be separately capture and recovered as a separate product that can be a substitute for bauxite to produce aluminum, particularly where the beds are provided on rotating disks so the beds can separately taken off line for removal of collected solids and liquids. This is particularly useful with some coals high in aluminum oxides and given bauxite ore is not readily available in some location. If the aluminum compounds are not separately recovered by recovered in the first catalytic flow-through bed the aluminum compounds go into the fertilizer products recovered using this method.

Irrespective of the embodiment of the present method and apparatus that is employed at least 95% or 99% reduction in sulfur oxides, nitrogen oxides and carbon oxides compared to the content in the stack gases delivered to the a first catalytic flow-through bed. The present method can also be useful for focusing on collection of sulfur oxides where sulfur oxides are particularly a problem such as in coal fired plants of 50 to 100 KW. These plants are targeted by EPA for conversion to natural gas or propane fired plants at considerable cost. The present method allow these plants to continue to operate as coal fired power plants and meet the EPA sulfur oxide standards for sulfur emission. The method also results coal-fired power plants of less the 50 KW to continue to operate, where these power plant would otherwise are targeted to shutdown because of inability to comply with new EPA sulfur oxide standards.

Also disclosed is apparatus of cleaning carbon oxides, sulfur oxides, nitrogen oxides from stack gases comprising: (a) assembling an stack adapted to pass stack gases selected from the group consisting of volatiles from combustion of coal or from combustion of natural gas or from flue gas from cement kiln, (b) assembling in the stack adapted to pass stack gases a first catalytic flow-through bed of calcium zeolite comprising zeolite particles of a majority between 44 µm and 64 µm in size adapted to reduce carbon oxides from the stack gases, (c) assembling in the stack adapted to pass stack gases positioned adjacent the first catalytic flow-through bed, a second catalytic flow-through bed of a blend between 25 and 75% of sodium zeolite and calcium zeolite comprising zeolite particles of a majority between 65 µm and 125 µm in size adapted to reduce nitrogen oxides from the stack gases, (d) assembling in the stack adapted to pass stack gas positioned adjacent the second catalytic flow-through bed, a third catalytic flow-through bed of calcium zeolite comprising zeolite particles of a majority between 78 µm and 204 µm adapted to reduce sulfur oxides in the stack gases. The method results in the stack gases flowing through the first catalytic bed, the second catalytic bed, and the third catalytic bed adapted to collect solids in the catalytic beds so that stack gases exiting the third catalytic have at least 90% reduction in sulfur oxides, nitrogen oxides and carbon oxide. This apparatus may be utilized to provide at least 95% or 99% cleaning of the stack gas.

The first catalytic flow-through bed, the second catalytic flow-through bed and the third catalytic flow-through bed may each be assembled between screens of between 150 and 250 mesh to provide for flow-through while maintaining the zeolite particles in the beds. The beds can be accommodate any desired cross section according the cross-sectional area of the stack, with a depth corresponding to the flow rate of stack gases through the stack.

The first catalytic flow-through bed, the second catalytic flow-through bed, and the third catalytic flow-through bed can be assemble with parallel series of the first catalytic flow-through bed, the second catalytic flow-through bed and the third catalytic flow-through bed in a system that allows for continuous reduction and cleaning of stack gas while one or more series of like beds are purged to capture of fertilizer products and other commercial products and clean the beds for reuse. Another approach is to assemble the beds on rotating disks. This enables the catalytic flow-through beds to be maintained in operation cleaning the stack gases while other parts the same catalytic flow-through bed or a bed of similar composition is cleaned of collected solids and liquids for reuse. The later approach has the advance of allowing the individual beds to be taken out of use separately as desired, rather than require all beds in a series to be taken off line at once for purging to removing collected solids and liquid and clean for reuse. The first catalytic bed, the second catalytic bed, and the third catalytic bed may each be assembled on a rotating disk so a part of the bed or a similar bed can be maintained to continue to clean stack gas without interruption, while another portion of the bed or a similar bed is cleaned for reuse.

Also disclosed is the fertilizer product made by the processes described in the previous application. This product may include trace metals as such zinc compounds, lead compounds mercury compounds, uranium compounds, and rare earth metal compounds, as well as sulfate and fluoride compounds beneficial in fertilizers.

Other details, objects and advantages of the present invention will become apparent from the description of the preferred embodiments described below in reference to the accompanying drawings.

BRIEF DESCRIPTION OF THE DRAWINGS

The following description is described of the accompanying drawings.

DETAILED DESCRIPTION

Figure 1:
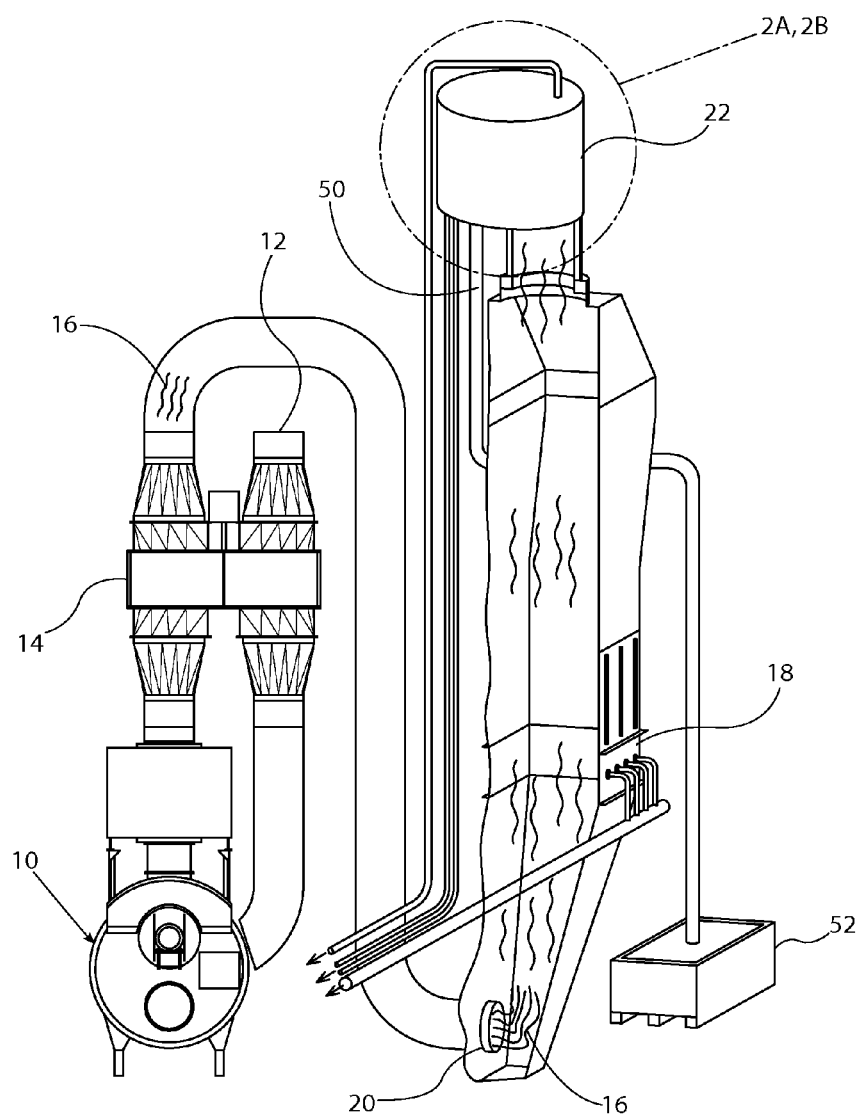
FIG. 1 is a schematic illustrating a coal-fired boiler for electric power generation using stack gases that are cleaned and solid/liquid products recovered in accordance with the present method and apparatus.

Referring to FIG. 1, schematic illustrating a coal-fired boiler for electric power generation using stack gases that are cleaned and solid/liquid products recovered. A coal fired boiler 10 is shown utilizing the stack gas cleaning and recovery apparatus and method of the present invention. Fresh air intake 12 flows through preheater 14 to supply preheated fresh air to the boiler 10 for coal firing. The stack gases 16 from boiler 10 pass through preheater 14 whereby heat is transferred to the fresh air intake 12.

The stack gases 16, now cooled by preheater 14, are conveyed to an emission control unit 18 where the stack gases 16 are circulated to inlet 20 to emission control system 18, where the stack gases 16 are allowed to rise through the emission control system 18 and through gas cleaning apparatus 22. The stack gases 16 at this point include pollutants according carbon monoxide, carbon dioxide, nitrogen oxides and sulfur oxides. The stack gases 16 also includes water and particulates such as aluminum oxides, mercury compounds, zinc compounds lead compounds, and other particulate matters such as uranium and rare earth metals, as well as halogens such as fluoride and chloride.

Figure 2A:
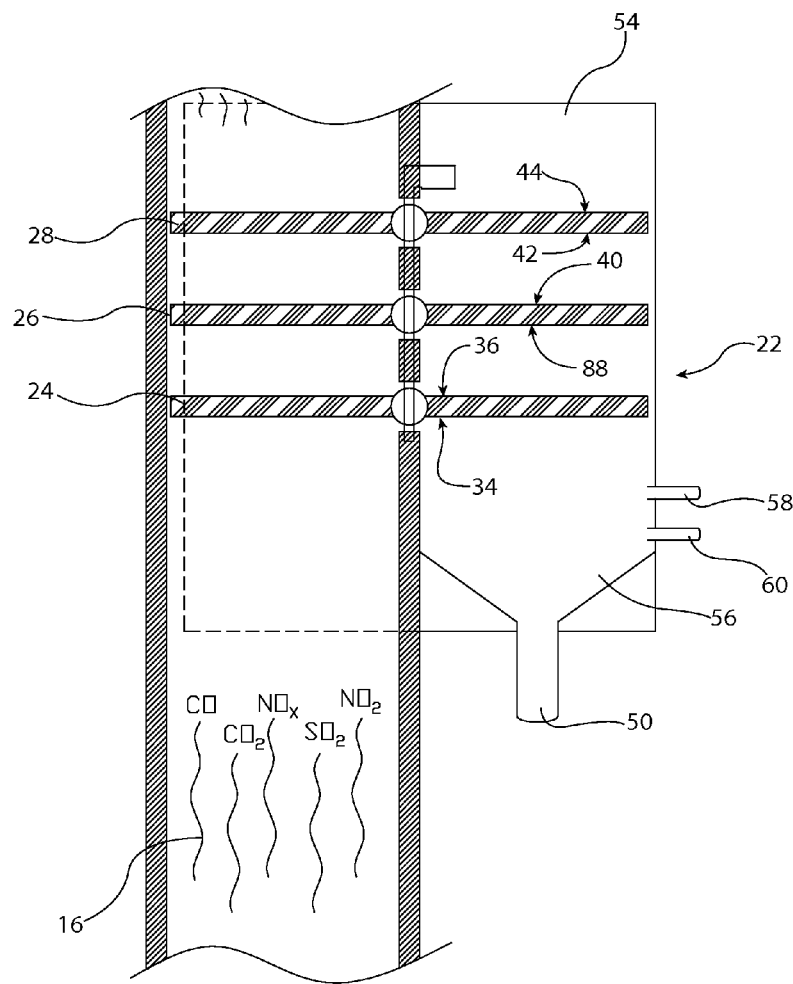
FIG. 2A is an enlarged portion of part of the stack gas cleaning and recovery apparatus shown in FIG. 1 where three catalytic flow-through beds are utilized.
Figure 2B:
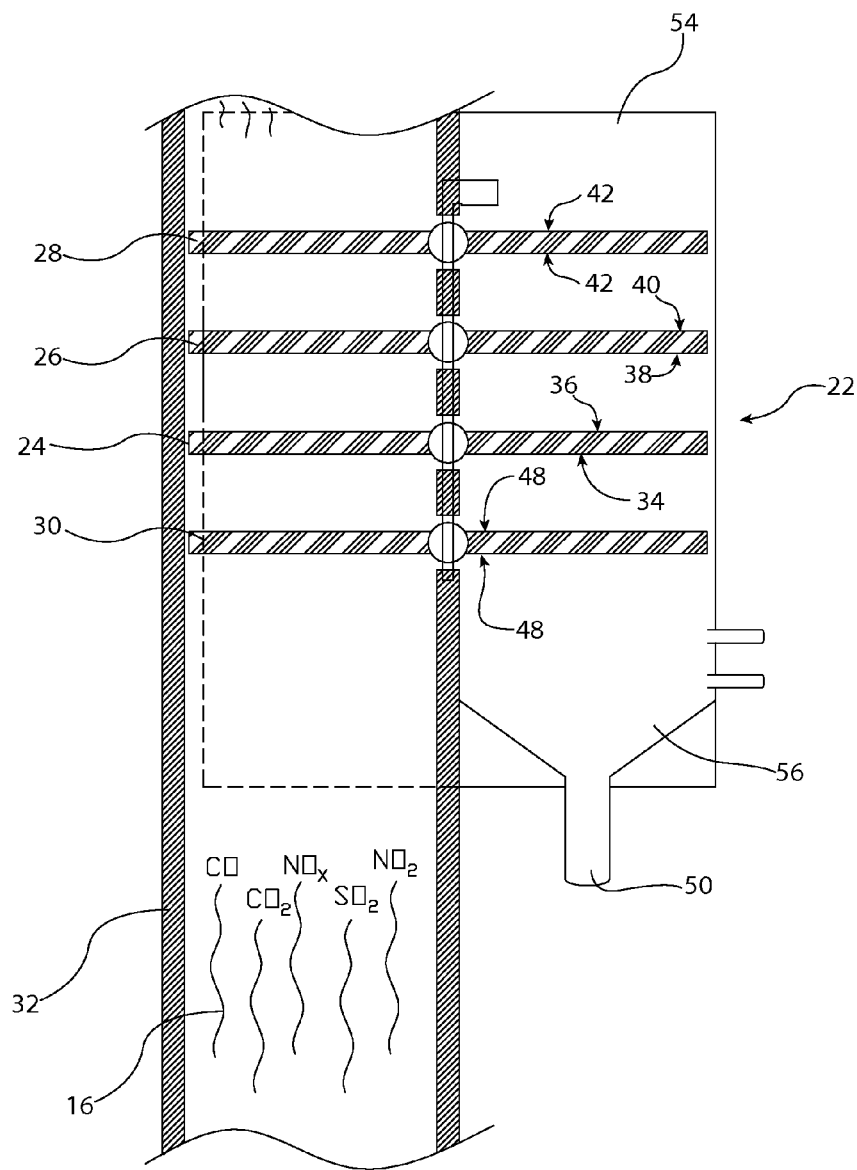
FIG. 2B is an enlarged portion of part of the stack gas cleaning and recovery apparatus shown in FIG. 1 where four catalytic flow-through beds are utilized.
Figure 3:
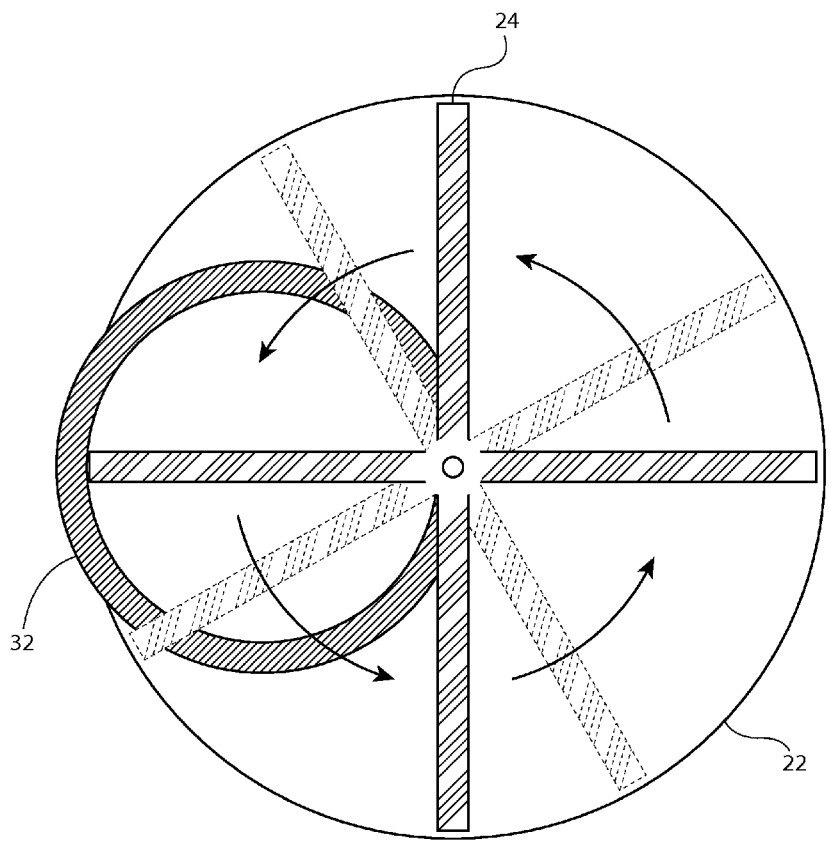
FIG. 3 is a cross-section taken along line 3-3 of FIG. 2A or FIG. 2B.

With reference to FIGS. 2A-B, gas cleaning apparatus 22 may comprise first catalytic flow-through bed 24, second catalytic bed 26 and third catalytic flow-through bed 28 as shown in FIG. 2A or through first catalytic flow-through bed 24, second catalytic flow-through bed 26, third catalytic flow-through bed 28 and fourth catalytic flow-through bed 30 as shown in FIG. 2B. In FIG. 2A, the rising stack gases 16 in gas cleaning apparatus 22 first flow through the first catalytic flow-through bed 24 followed by the adjacent second catalytic flow-through bed 26, and then followed by the third catalytic flow-through bed 28. When fourth catalytic flow-through bed 30 is utilized as shown in FIG. 2B, gas stack 16 in stack 32 first flow through fourth catalytic flow-through bed 30 and then through the adjacent first catalytic flow-through bed 24.

First catalytic flow through bed 24 is calcium zeolite comprised of zeolite particles with a majority between 44 μm and 64 μm in size. By a "majority" in the particle size range means here, as well as elsewhere in this application, that is highest in like particle size increments but that it necessarily is not 50% of the particle sizes in the zeolite of the bed. The particle size range of the calcium zeolite is indicative of the surface area, number of exposed pores, and ion exchange capacity of the calcium zeolite effective in the first catalytic flow-through bed. The calcium zeolite is a calcium-sodium-potassium aluminosilicate that is relative high calcium oxide greater than 2.75% by weight. Typical chemical analyses of calcium zeolite are (i) 2.85% calcium oxide (CaO), 2.85% potassium oxide ($K_2O$), 0.98% manganese oxide (MgO), 0.06% manganese oxide (MnO), 0.19% titanium dioxide ($TiO_2$), 0.05% potassium oxide ($P_2O_5$), 0.03% sodium oxide ($Na_2O$), 11.43% aluminum oxide ($Al_2O_3$), 1.26% ferric oxide ($Fe_2O_3$) and 66.35% silicon dioxide ($SiO_2$), and (ii) 3.4% calcium oxide (CaO), 3.0% potassium oxide ($K_2O$), 1.5% manganese oxide (MgO), 0.05% potassium oxide ($P_2O_5$), 0.3% sodium oxide ($Na_2O$), 12.1% aluminum oxide ($Al_2O_3$), 1.6% ferric oxide ($Fe_2O_3$) 70.0% silicon dioxide ($SiO_2$). The remainder may comprise of other oxides ($R_2O_3$). A source for calcium zeolite, amongst others, is St. Cloud Mining Company mines at Winston and Truth or Consequences, New Mexico 87901.

The depth and breadth of the first bed 24 is determined by the flow rate of the stack gases 16 and the physical dimensions of the stack 32 and gas cleaning apparatus 22 through which stack gases 16 are conveyed. First catalytic flow-through bed 24 is provided as a flow through bed held in position by lower screen 34 and upper screen 36 each of between 150 and 350 mesh designed to hold the zeolite particles of calcium zeolite in position in the bed, while allowing flow through of the stack gases 16 with the desired flow rate.

The primary function of first catalytic flow-through bed 24 is to reduce carbon monoxide and carbon dioxide in the zeolite bed. First catalytic flow-through bed 24 also captures ash and other particular matter as well as aluminum oxide if the fourth catalytic flow-through bed 30 is not provided as shown in FIG. 2A.

The stack gases 16 in stack cleaning apparatus 22 then flow through second catalytic flow-through bed 26 positioned adjacent first catalytic flow-through bed 24. Second catalytic flow-through bed 26 is comprised of a blend between 25 and 75% of sodium zeolite and calcium zeolite with a majority of the zeolite particles between 65 μm and 125 μm in size. The particle size range of sodium zeolite and calcium zeolite in the blend is indicative of the surface area, number of exposed zeolite pores, and ion exchange capacity of the sodium zeolite/calcium zeolite blend effective in the second catalytic flow-through bed. The source of the calcium zeolite can be the same as that used to provide first catalytic flow-through bed 24, but with a majority particle size between 65 μm and 125 μm. The sodium zeolite may be natural sodium-potassium clinoptilolite that is relative high sodium oxide greater than 2.75% by weight. Typical chemical analyses of a sodium zeolite are (i) 3.5% sodium oxide ($Na_2O$), 3.8% potassium oxide ($K_2O$), 11.9% aluminum oxide ($Al_2O_3$), 0.7% ferric oxide ($Fe_2O_3$), 0.8% calcium oxide (CaO), 0.4% manganese oxide (MgO), 0.02% manganese oxide (MnO), 0.1% titanium oxide ($TIO_2$) and 69.1% silicon dioxide ($SiO_2$), and (ii) 3.03% sodium oxide ($Na_2O$), 3.59% potassium oxide ($K_2O$), 10.27% aluminum oxide ($Al_2O_3$), 0.86% ferric oxide ($Fe_2O_3$), 1.77% calcium oxide (CaO), 0.00% potassium oxide ($K_2O$), 0.4% manganese oxide (MgO), 0.02% manganese oxide (MnO), 0.11% titanium oxide ($TIO_2$), 69.1% silicon dioxide ($SiO_2$), and 13.09% LOI. The remainder may comprise other oxides ($R_2O_3$). A source of the sodium zeolite, amongst others, is the St. Cloud mines in Ash Meadows, Nev. Again the size and depth of the second flow-though bed is determined by the physical dimensions of the stack 32 and the flow rate through the stack 32 at second catalytic flow-through bed 26 in the gas cleaning apparatus 22.

The primary purpose of the second flow through bed 26 is to capture and reduce nitrogen oxides (NOx) in the stack gas 16. The second catalytic flow through bed 26 is also effective in reduce water and metal compounds such as mercury, lead, uranium and other trace materials. Again, a lower screen 38 and an upper screen 40 may be provided with mesh sizes between 150 and 350 mesh to maintain the zeolite particles in the third catalytic flow-through bed 28, while allowing the desire flow rate through of stack gas 16.

On exiting the second catalytic flow-through bed 26, the stack gases 16 flow through the adjacent third catalytic flow-through bed 28. The third catalytic flow-through bed is comprised of calcium zeolite similar in chemical analysis to the first catalytic flow-through bed 24 with a majority of zeolite particles size between 78 μm and 204. The particle size range of calcium zeolite is again indicative of the surface area, number, of exposed zeolite pores, and ion exchange capacity of the calcium zeolite in the third catalytic flow-through bed.

The third catalytic flow-through bed 28 is primarily to reduce sulfur oxides present in the stack gas 16. The third catalytic flow through bed may also reduces sulfur acids, calcium compounds and ash in the stack gas 16. The composition of calcium zeolite in third catalytic flow through bed 28 may be of the same composition as the first catalytic flow through bed 24, but with zeolite particle of different particle size as described. Again, a lower screen 42 and an upper screen 44 is with mesh size between 150 and 350 mesh is provided to maintain the zeolite particles in the third catalytic flow through bed 28.

Where a fourth catalytic flow through bed 30 is provided as shown in FIG. 2B, the fourth catalytic flow-through bed is provided in the stack gas 16 adjacent the first catalytic flow-through bed 24. This embodiment provides that the gas stream 16 may flow through the fourth catalytic-flow-through bed 30 before flowing through the first catalytic flow-through bed 24. The composition of the fourth catalytic flow-through bed 30 is the same as the first catalytic flow-through bed, namely, comprised of calcium zeolite with a majority of the zeolite particles between 44 μm and 64 μm in size. The zeolite particles in fourth catalytic flow-through bed are maintained in position by lower screen 46 and upper screen 48 with a mesh size between 150 and 350, while allowing flow of stack gas 16 though the bed. An electrical charge is also provided on the lower screen 46 to provide that the fourth catalytic flow-through bed 30 attracts and retains aluminum particles from stack gas 16. The particle size range of calcium zeolite is again indicative of the surface area, number, of exposed zeolite pores, and ion exchange capacity of the calcium zeolite in the fourthcatalytic flow-through bed.

Thus, the stack gas 16 flowing through gas cleaning apparatus 22 is substantially cleaned of aluminum compounds carbon dioxide, carbon monoxide, nitrogen oxides, sulfur oxides. It may also clean mercury compounds, zinc compounds, lead compounds, water and other trace particulate in the stack gas 16. The cleaning of the stack gases 16 flow through first catalytic flow-through bed 24, second catalytic flow-through bed 26, third catalytic flow-through bed 28 and, if present, fourth catalytic flow-through bed 30 provides at least 90%, 95%, or 99% reduction in aluminum compounds, sulfur oxides, nitrogen oxides and carbon oxides from the stack gases 16. Where the fourth catalytic flow-through catalytic bed 30 is provided as shown in FIG. 2B, aluminum oxide may be largely separately collected and separately processed to recovered as explained below.

Figure 4:
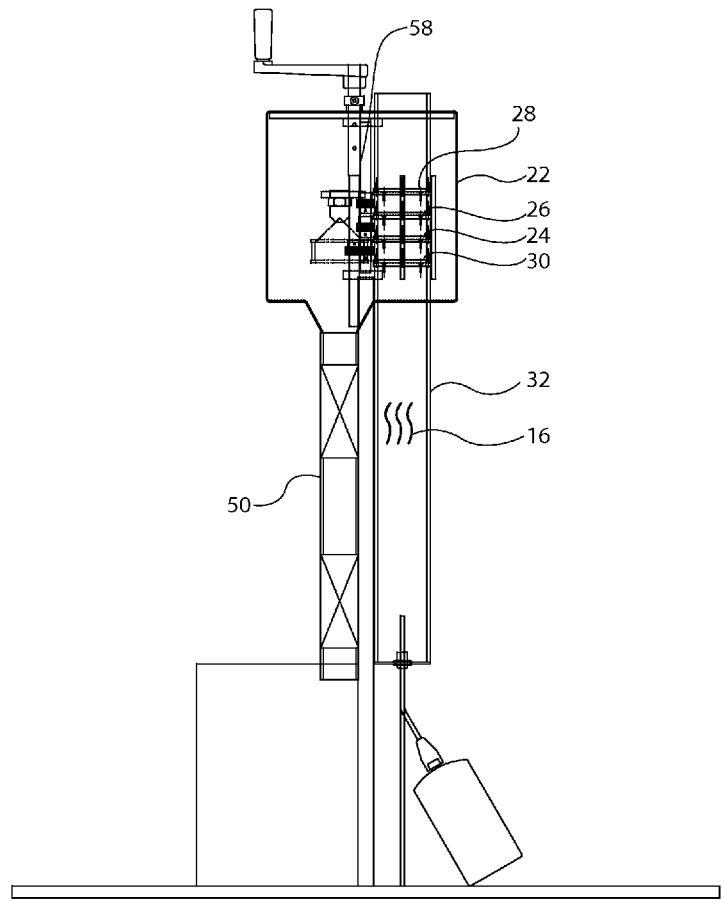
FIG. 4 is a schematic illustrating a test facility designed to test the cleaning of stack gases and recovery of solids and liquids with the present method and apparatus.

To demonstrate the operation of the present method and apparatus the test facility shown in FIGS. 4 through 6 was assembled and operated to perform tests as described below. As shown in FIG. 4, the gas cleaning apparatus 22 has the first catalytic through-flow bed 24, second catalytic through-flow bed 26, third catalytic through-flow bed 28 and fourth catalytic through-flow bed 30 (where used). Each of the catalytic through-flow beds may be individually rotated using the handle 60 and the gear assembly 58 shown in FIGS. 5 and 6. Stack gas 16 is brought up though stack 12 and through the first catalytic through-flow bed 24, second catalytic through-flow bed 26 and third catalytic through-flow bed 28 or the first catalytic through-flow bed 24, second catalytic through-flow bed 26, third catalytic through-flow bed 28 and fourth catalytic through-flow bed 30 in gas cleaning apparatus 2 as shown in FIGS. 4 and 5.

The test apparatus includes stack 32 for transporting stack gas 16 to the gas cleaning apparatus 22 described above. The gas cleaning apparatus 22 is shown in further detail in FIG. 5 with first 24, second 26 and third 28 catalytic through-flow beds having a zeolite beds as described above. Each of the catalytic through-flow beds is connected to a central drive shaft 58 that is adapted to rotate each of the catalytic through-flow beds, individually, from a first position where stack gas 16 passes through the bed to a second position where the catalytic through-flow bed can purged by the nitrogen. A handle 60 is provided that may be translated vertically to select one of the catalytic through-flow beds and rotated to move the selected through-flow bed from the first position to the second position. FIG. 6 is a top view of the gas cleaning apparatus 22 according to the testing apparatus shown in FIGS. 4-5. In this view, the catalytic through-flow beds are aligned with the stack 32.

When then gas stack 16 was stopped, the catalytic through-flow beds were each individually rotated over exit tube 50 and nitrogen gas was delivered downwardly through inlet 60 and through the rotated catalytic through-flow bed to remove solids and liquids collected on the rotated bed into the bucket shown in FIG. 4 The purging may also produce gases, such as oxygen ($O_2$) and nitrogen ($N_2$) that may be extracted and transported as portion of the gases (e.g. $N_2$) to a recycler and a second gas outlet that transports a portion of the gases (e.g. $O_2$) to the burner for combusting the fuel.

Figure 5:
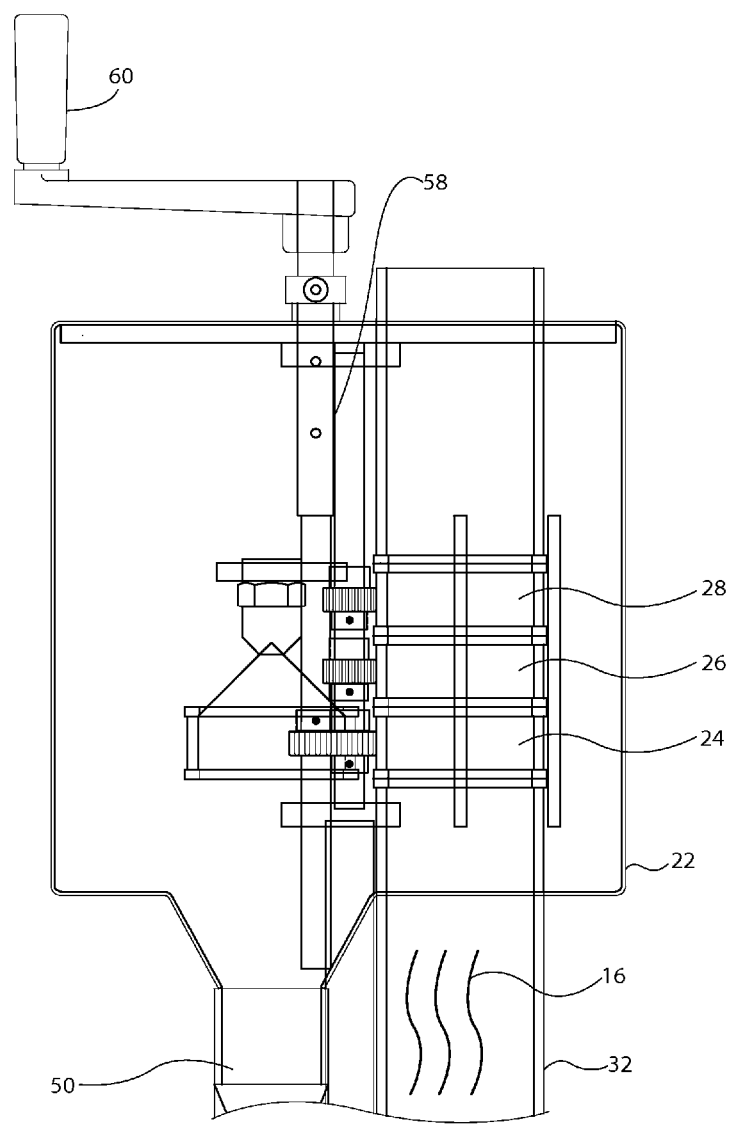
FIG. 5 is an enlarged portion of the test facility shown in FIG. 4.
Figure 6:
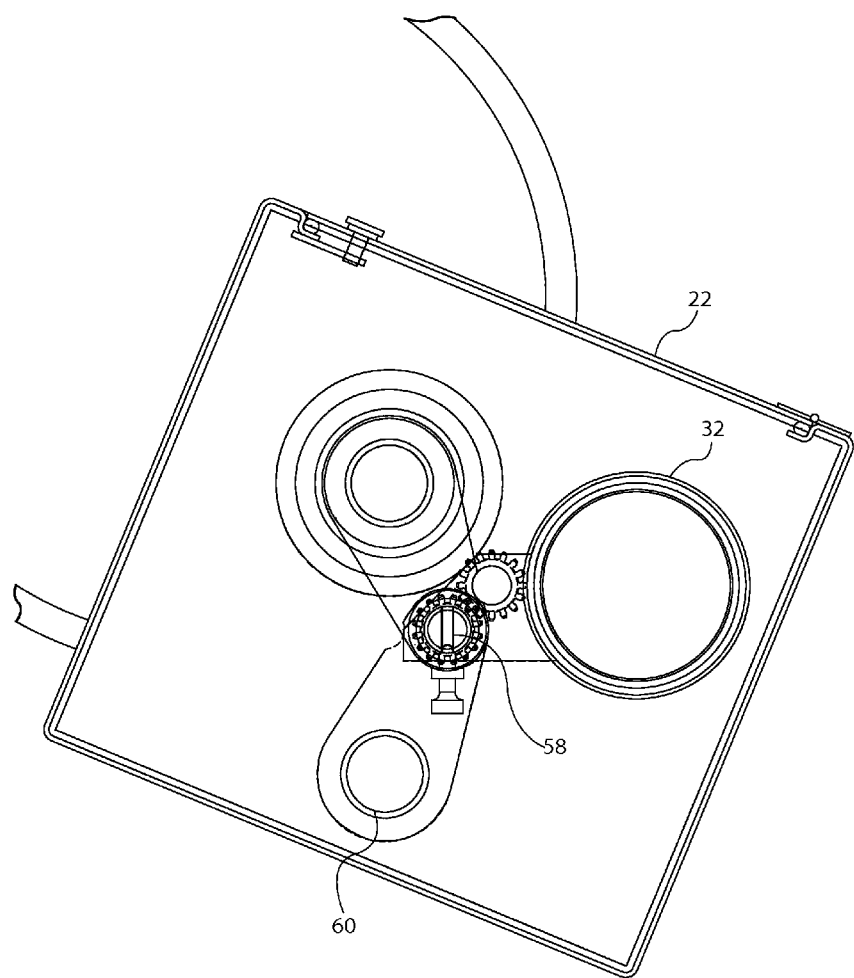
FIG. 6 is an illustration corresponding to FIG. 5 in top view showing the movement of catalytic flow-through beds in FIG. 5.

The tests with the test facility shown in FIGS. 4-6 included Kentucky coal fired by propane, Ohio coal fired and two tests with charcoal mixed with organic sulfur. The samples were fired by a propane burner at 62 shown in FIG. 4 or in a combustion oven (not shown) before positioning below stack 32. These illustrate the operation of the method and equipment. The data from these tests is set forth in table and graphic form in the Appendix to this application.

Figure 7A:
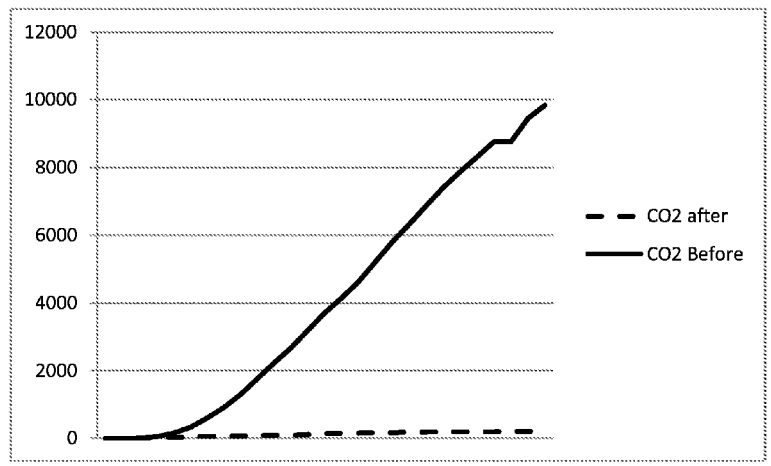
FIG. 7A is a graph illustrating $CO_2$ before and after cleaning.
Figure 7B:
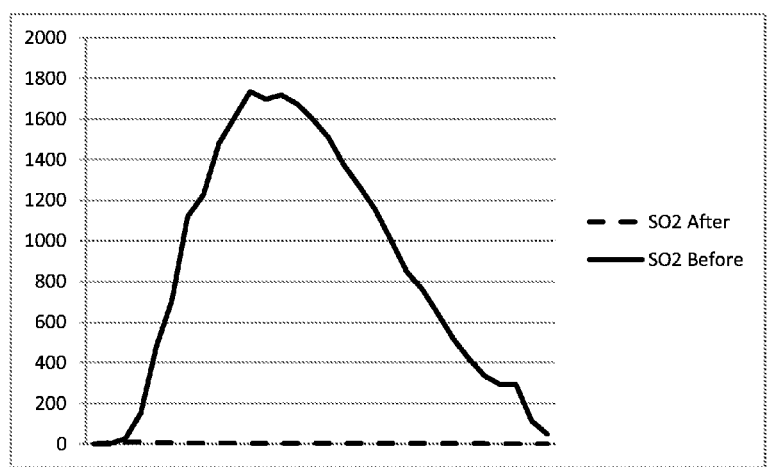
FIG. 7B is a graph illustrating $SO_2$ before and after cleaning.
Figure 7C:
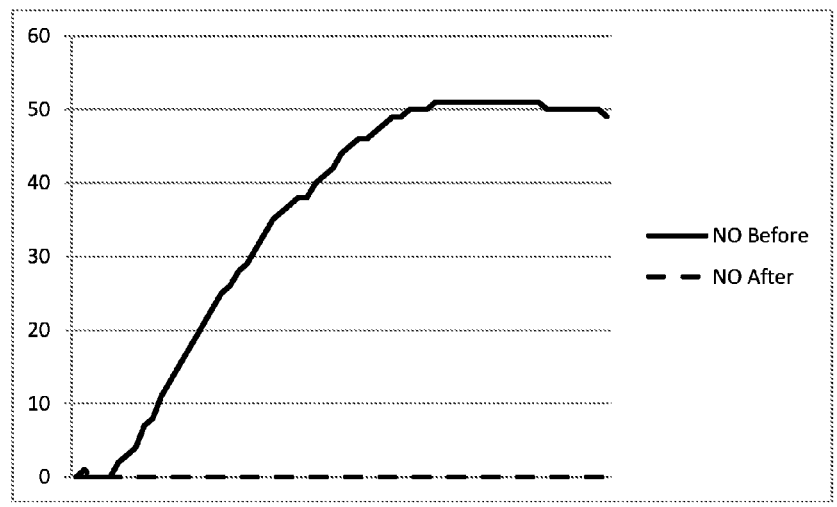
FIG. 7C is a graph illustrating NO before and after cleaning.

FIGS. 7A-C represent data taken from a combustion gas emissions test where charcoal and organic sulfur were combusted in a combustion oven. During a first test run, data was collected by a probe in a lower flue stack before the stack gas 16 passed through the gas cleaning apparatus 22. During a like second test run, data was collected by a probe in the upper flue stack after the stack gas 16 passed through the gas cleaning apparatus. Data was collected every 5 seconds using a Testo 350XL portable combustion multi-gas analyzer. Data for the first test run (lower flue stack) was compared to and plotted with data for the second test run (upper flue stack) to provide an analysis of the results of the gas cleaning apparatus 22.

FIG. 7A illustrates measured levels of carbon dioxide (ppm) before (solid line) and after (dashed line) the stack gas 16 is cleaned bypassing through the first catalytic through-flow bed 24, second catalytic through-flow bed 26, third catalytic through-flow bed 28 of the gas cleaning apparatus 22.

FIG. 7B illustrates measured levels of sulfur dioxide before (solid line) and after (dashed line) the stack gas 16 is cleaned by the gas cleaning apparatus 22.

FIG. 7C illustrates measured levels of nitrous oxide before (solid line) and after (dashed line) the stack gas 16 is cleaned by the gas cleaning apparatus 22.

It was found by the comparison of the data that carbon dioxide in the stack gas 16 was reduced by at least 95% by the coal cleaning apparatus 22; sulfur dioxide in the stack gas 16 was reduced by at least 99% by the coal cleaning apparatus 22; and nitrogen oxide in the stack gas 16 was reduced by 99% or more by the coal cleaning apparatus 22. These results demonstrate the high effectiveness of the gas cleaning apparatus 22. As the data in the Appendix also show, the oxygen levels in each of the tests increased with the stack gas 16 flowing through the first catalytic through-flow bed 24, second catalytic through-flow bed 26, third catalytic through-flow bed 28 of the gas cleaning apparatus 22 demonstrating the reduction of the carbon oxides, sulfur oxides and nitrogen oxides in the catalytic through-flow beds.

While the principle and mode of operation of this invention have been explained and illustrated with regard to particular embodiments, it must be understood, however, that this invention may be practiced otherwise than as specifically explained and illustrated without departing from its spirit or scope.

Appendix A
23g Charcoal & 3g Organic Sulfur
| | Lower Flue Stack | | | | | | | Upper Flue Stack | | | | | | |
|---|---|---|---|---|---|---|---|---|---|---|---|---|---|---|
| sec | % O2 | CO | NO | SO2 | NO2 | H2 | NOX | % O2 | CO | NO | SO2 | NO2 | H2 | NOX |
| 0 | 20.93 | +++ | | 5 | 0 | +++ | | 20.94 | 0 | 0 | 6 | 0.5 | 0 | 0 |
| 5 | 20.47 | +++ | 0 | 5 | 1.2 | +++ | | 20.94 | 0 | 0 | 6 | 0.7 | 0 | 0 |
| 10 | 20.42 | +++ | 1 | 5 | 0.5 | +++ | 1 | 20.94 | 0 | 0 | 6 | 0.7 | 0 | 0 |
| 15 | 20.41 | 0 | 2 | 6 | 0 | +++ | 2 | 20.94 | 0 | 0 | 6 | 0.7 | 0 | 0 |
| 20 | 20.35 | 0 | 1 | 6 | 0 | +++ | 1 | 20.94 | 0 | 0 | 6 | 0.7 | 0 | 0 |
| 25 | 20.13 | 8 | 2 | 24 | C.0 | +++ | 2 | 20.94 | 0 | 0 | 6 | 0.7 | 0 | 0 |
| 30 | 20.06 | 8 | 3 | 57 | C.0 | +++ | 3 | 20.94 | 0 | 0 | 6 | 0.7 | 0 | 0 |
| 35 | 19.76 | 78 | 3 | 67 | C.0 | +++ | 3 | 20.94 | 0 | 0 | 6 | 0.6 | 0 | 0 |
| 40 | 19.83 | 228 | 5 | 73 | C.0 | +++ | 5 | 20.94 | 0 | 0 | 6 | 0.6 | 0 | 0 |
| 45 | 18.98 | 538 | 6 | 88 | C.0 | +++ | 6 | 20.94 | 0 | 0 | 6 | 0.6 | 0 | 0 |
| 50 | 18.88 | 888 | 8 | 88 | C.0 | +++ | 8 | 20.94 | 0 | 0 | 6 | 0.5 | 0 | 0 |
| 55 | 18.92 | 1298 | 10 | 88 | C.0 | 936 | 10 | 20.94 | 0 | 0 | 6 | 0.5 | 0 | 0 |
| 60 | 19.40 | 2203 | 12 | 62 | C.0 | 824 | 12 | 20.94 | 2 | 0 | 6 | 0.5 | 0 | 0 |
| 65 | 18.96 | 4877 | 18 | 20 | C.0 | 721 | 18 | 20.94 | 4 | 0 | 6 | 0.5 | 0 | 0 |
| 70 | 18.71 | 5855 | 20 | 0 | C.0 | 78 | 20 | 20.94 | 7 | 0 | 6 | 0.5 | 0 | 0 |
| 75 | 18.31 | 8172 | 20 | 0 | C.0 | 153 | 20 | 20.94 | 7 | 0 | 6 | 0.5 | 0 | 0 |
| 80 | 17.94 | 6724 | 22 | 0 | C.0 | 290 | 22 | 20.94 | 7 | 0 | 6 | 0.5 | 0 | 0 |
| 85 | 17.63 | 7167 | 23 | 0 | C.0 | 396 | 23 | 20.94 | 7 | 0 | 6 | 0.5 | 0 | 0 |
| 90 | 17.73 | 7675 | 24 | 0 | C.0 | 502 | 24 | 20.94 | 7 | 0 | 6 | 0.5 | 0 | 0 |
| 95 | 17.50 | 8018 | 26 | 0 | C.0 | 666 | 26 | 20.94 | 7 | 0 | 6 | 0.5 | 0 | 0 |
| 100 | 17.18 | 3483 | 14 | 0 | C.0 | 830 | 30 | 20.94 | 4 | 0 | 6 | 0.5 | 0 | 0 |
| 105 | 17.16 | 4079 | 17 | 0 | C.0 | 17 | 17 | 20.94 | 8 | 0 | 6 | 0.5 | 0 | 0 |
| 110 | 17.40 | 1101 | 14 | 0 | C.0 | 77 | 14 | 20.94 | 10 | 0 | 6 | 0.5 | 0 | 0 |
| 115 | 18.92 | 4877 | 18 | 0 | C.0 | 824 | 18 | 20.94 | 12 | 0 | 6 | 0.5 | 0 | 0 |
| 120 | 18.96 | 949 | 27 | 0 | C.0 | 936 | 27 | 20.94 | 14 | 0 | 6 | 0.5 | 0 | 0 |
| 125 | 15.38 | 9846 | 28 | 0 | C.0 | +++ | 28 | 20.94 | 15 | 0 | 6 | 0.5 | 0 | 0 |
| 130 | 14.98 | 8964 | 28 | 0 | C.0 | +++ | 28 | 20.94 | 16 | 0 | 6 | 0.5 | 0 | 0 |
| 135 | 13.47 | | 30 | 0 | C.0 | +++ | 30 | 20.94 | 19 | 0 | 6 | 0.7 | 0 | 0 |
| 140 | 12.90 | | 32 | 0 | C.0 | +++ | 32 | 20.94 | 21 | 0 | 6 | 0.7 | 0 | 0 |
| 145 | 12.78 | | 32 | 0 | C.0 | +++ | 32 | 20.94 | 23 | 0 | 6 | 0.7 | 0 | 0 |
| 150 | 12.21 | | 33 | 0 | C.0 | +++ | 33 | 20.94 | 24 | 0 | 6 | 0.7 | 0 | 0 |
| 200 | 11.96 | +++ | 34 | 0 | C.0 | +++ | 34 | 20.94 | 27 | 0 | 6 | 0.7 | 0 | 0 |
| 215 | 11.72 | +++ | 34 | 0 | C.0 | +++ | 34 | 20.94 | 27 | 0 | 6 | 0.7 | 0 | 0 |
| 220 | 11.43 | +++ | 35 | 0 | C.0 | +++ | 35 | 20.94 | 29 | 0 | 6 | 0.7 | 0 | 0 |
| 225 | 11.26 | +++ | 35 | 0 | C.0 | +++ | 35 | 20.94 | 30 | 0 | 6 | 0.7 | 0 | 0 |
| 230 | 11.18 | +++ | 36 | 0 | C.0 | +++ | 36 | 20.94 | 32 | 0 | 6 | 0.7 | 0 | 0 |
| 265 | 10.91 | +++ | 36 | 0 | C.0 | +++ | 36 | 20.94 | 34 | 0 | 6 | 0.7 | 0 | 0 |
| 290 | 10.48 | +++ | 36 | 0 | C.0 | +++ | 36 | 20.94 | 35 | 0 | 6 | 0.7 | 0 | 0 |
| 295 | 10.36 | +++ | 36 | 0 | C.0 | +++ | 36 | 20.94 | 35 | 0 | 6 | 0.7 | 0 | 0 |
| 305 | 10.30 | +++ | 36 | 0 | C.0 | +++ | 36 | 20.94 | 35 | 0 | 6 | 0.7 | 0 | 0 |
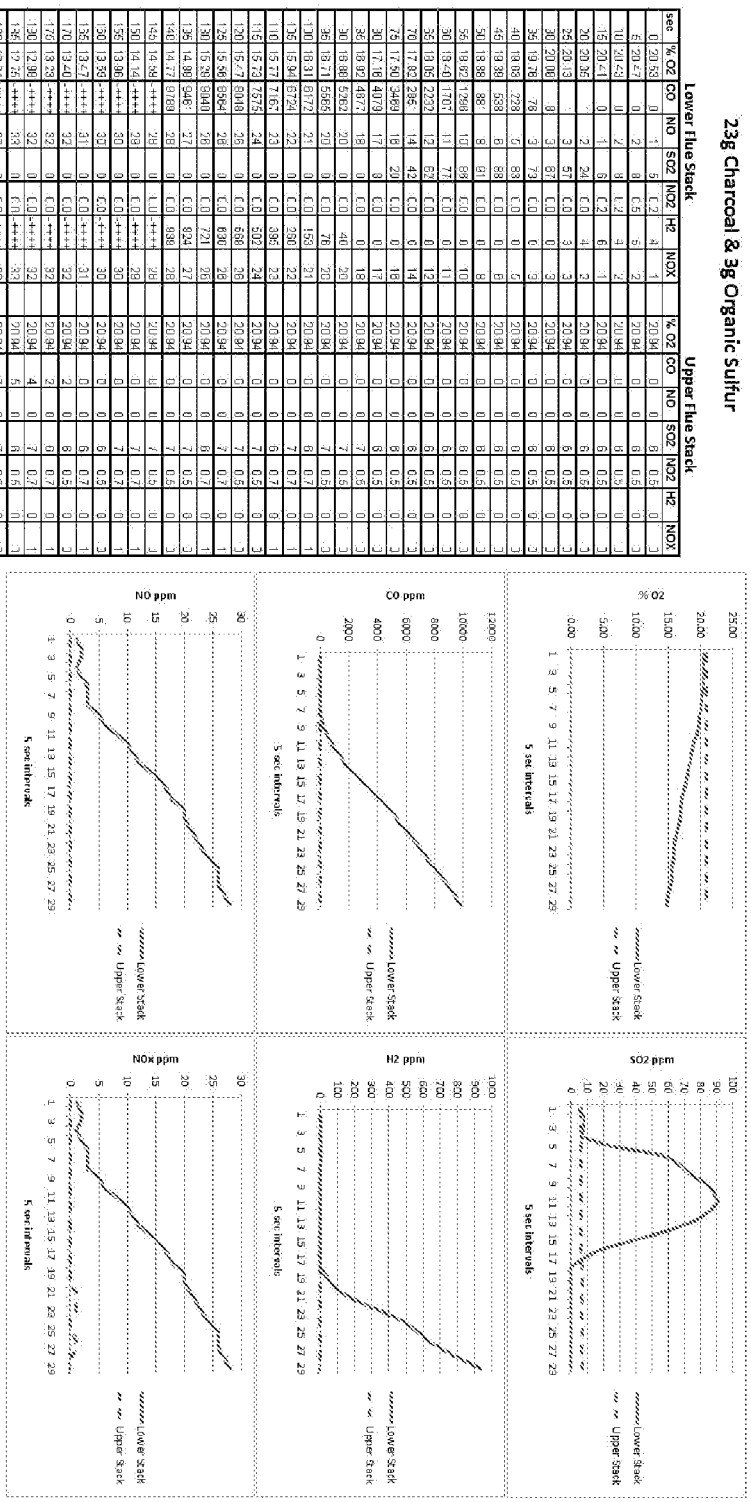

Appendix A
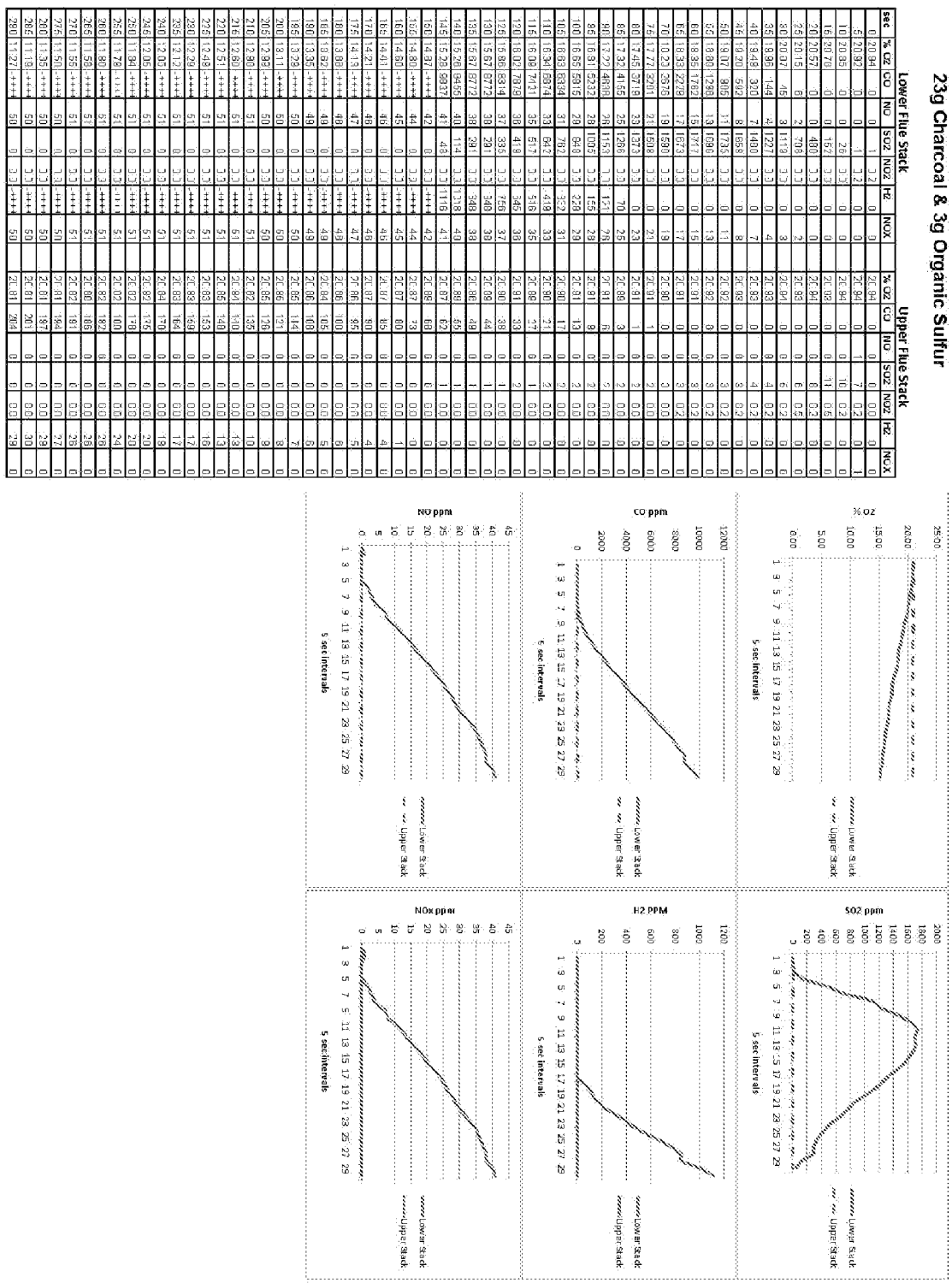

Appendix A
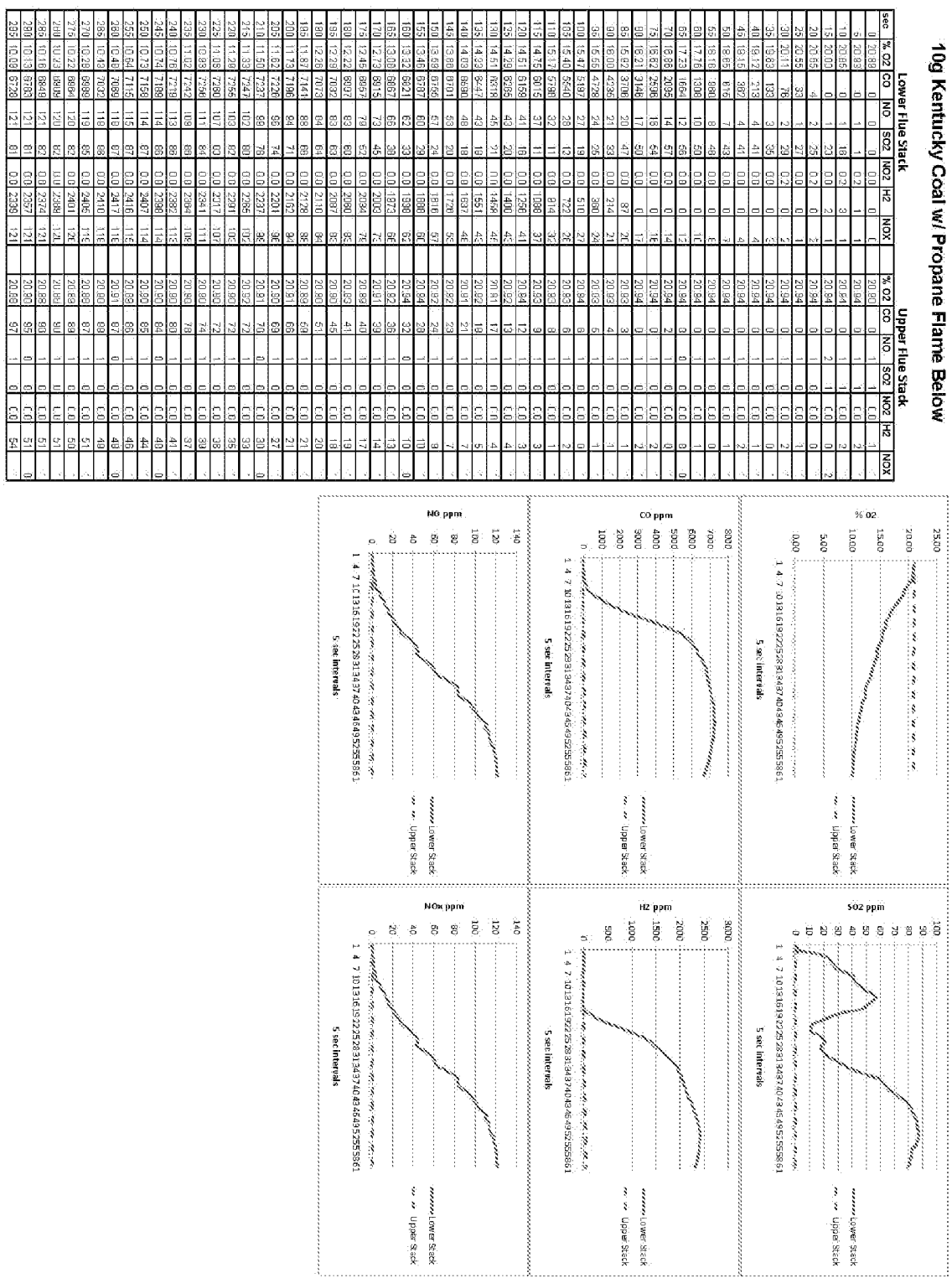

Appendix A
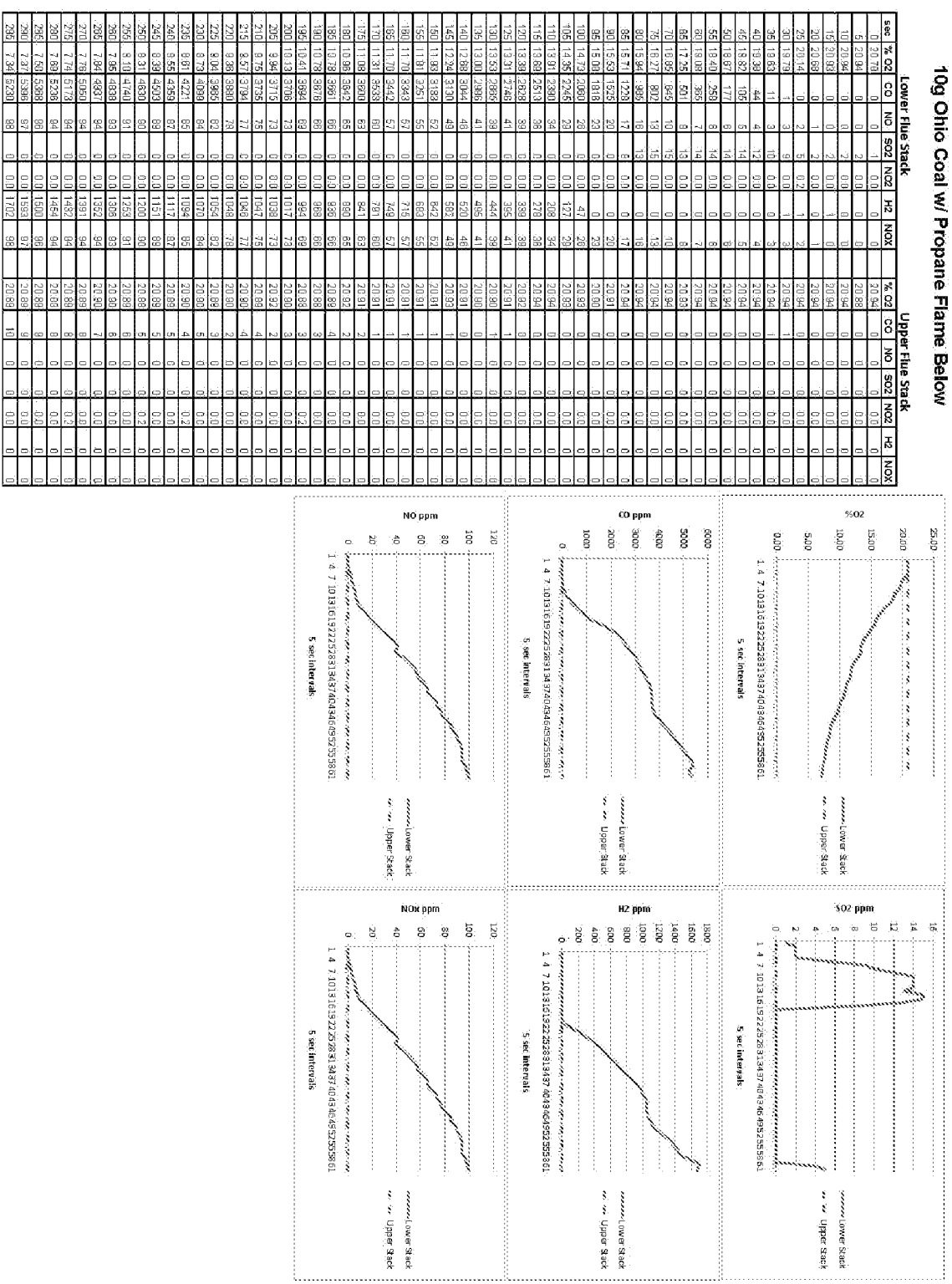

What is claimed is:

1. A method of cleaning stack gases comprising the steps of:
   (a) providing in a stack adapted to pass stack gases through a first catalytic flow-through bed of calcium zeolite comprising zeolite particles of a majority between 44 μm and 64 μm in size adapted to reduce carbon oxides from the stack gases,
   (b) providing in the stack adapted to pass stack gases positioned adjacent the first catalytic flow-through bed, a second catalytic flow-through bed of a blend between 25 and 75% of sodium zeolite and calcium zeolite comprising zeolite particles of a majority between 65 μm and 125 μm in size adapted to reduce nitrogen oxides from the stack gases,
   (c) providing in the stack adapted to pass stack gas positioned adjacent the second catalytic flow-through bed, a third catalytic flow-through bed of calcium zeolite comprising zeolite particles of a majority between 78 μm and 204 μm adapted to reduce sulfur oxides in the stack gases, and
   (d) passing stack gases selected from the group consisting of volatiles from combustion of coal or from combustion of natural gas or propane or from a cement kiln sequential through the first catalytic bed, the second catalytic bed, and the third catalytic bed each collecting solids in the catalytic beds and providing gas exiting the third catalytic bed with at least 90% reduction in sulfur oxides, nitrogen oxides, and carbon oxide.

2. The method as set forth in claim 1 where the beds providing the first catalytic bed, the second catalytic bed and the third catalytic bed are each positioned between screens each of between 150 and 350 mesh.

3. The method as set forth in claim 1 where the first catalytic bed, the second catalytic bed, and the third catalytic bed are each provided on a rotating disk.

4. The method as set forth in claim 1 where at least two series of sequential through the first catalytic bed, the second catalytic bed, and the third catalytic bed are provided in parallel so stack gas can be cleaned by the method through one series of beds while other series of the beds can be cleaned.

5. The method as set forth in claim 1 comprising in addition a fourth catalytic flow-through bed of calcium zeolite comprising zeolite particles between 44 μm and 64 μm in size positioned in the stack before the first catalytic bed with an electrical charge beneath said fourth catalytic flow-through bed to collect aluminum compounds from the stack gases before passing through the first catalytic bed.

6. The method as set forth in claim 1 where the stack gases exiting from third catalytic bed through the stack have at least 95% reduction in sulfur oxides, nitrogen oxides, and carbon oxide compared to the stack gases delivered to the a first catalytic flow-through bed.

7. The method as set forth in claim 5 where the stack gases exiting from third catalytic bed through the stack have at least 95% reduction in aluminum compounds, sulfur oxides, nitrogen oxides and carbon oxide compared to the stack gases delivered through the stack to the fourth catalytic flow-through bed.

8. The method as set forth in claim 1 where the stack gases exiting a stack from the third catalytic bed through the stack is at least 99% reduction in sulfur oxides, nitrogen oxides and carbon oxide compared to the stack gases delivered through the stack to the a first catalytic flow-through bed.

9. The method as set forth in claim 4 where the gases exiting a stack from the third catalytic bed is at least 99% reduction in aluminum compounds, sulfur oxides, nitrogen oxides, and carbon oxide compared to the stack gases delivered through the stack to the fourth catalytic flow-through bed.

10. A method of cleaning stack gases comprising the steps of:
    (a) providing in a stack adapted to pass stack gases through a first catalytic flow-through bed of calcium zeolite comprising zeolite particles of a majority between 44 μm and 64 μm in size adapted to reduce carbon oxides from the stack gases,
    (b) providing in the stack adapted to pass stack gases positioned adjacent the first catalytic flow-through bed, a second catalytic flow-through bed of a blend between 25 and 75% of sodium zeolite and calcium zeolite comprising zeolite particles of a majority between 65 μm and 125 μm in size adapted to reduce nitrogen oxides from the stack gases,
    (c) providing in the stack adapted to pass stack gas positioned adjacent the second catalytic flow-through bed, a third catalytic flow-through bed of calcium zeolite comprising zeolite particles of a majority between 78 μm and 204 μm adapted to reduce sulfur oxides in the stack gases,
    (d) passing stack gases selected from the group consisting of volatiles from combustion of coal or from combustion of natural gas or propane or from a cement kiln sequential through the first catalytic bed, the second catalytic bed, and the third catalytic bed each collecting solids and liquids in the catalytic beds and providing gas exiting the third catalytic bed with at least 90% reduction in sulfur oxides, nitrogen oxides, and carbon oxide compared to the stack gases before entering the first catalytic bed,
    (e) purging solids and liquids from the first catalytic bed, the second catalytic bed, and the third catalytic bed by intermittently passing nitrogen through the beds to remove solids and liquids collected from the stack gases by the beds.

11. The method as set forth in claim 10 where the beds providing the first catalytic bed, the second catalytic bed and the third catalytic bed are each positioned between screens each of between 150 and 350 mesh.

12. The method as set forth in claim 10 where first catalytic bed, second catalytic bed, and third catalytic bed are purged with liquid nitrogen to remove solids and liquids collected from the stack gases by the beds.

13. The method as set forth in claim 10 where the first catalytic bed, the second catalytic bed, and the third catalytic bed are each provided on a rotating disk.

14. The method as set forth in claim 10 where the first catalytic bed, the second catalytic bed, and the third catalytic bed are each provided on a rotating disk such that the stack gases in step (d) can be continuously passed through a first catalytic bed, a second catalytic bed, and a third catalytic bed to provide collection of solids and liquids from the stack gases while other portions of the same beds or like beds are purged with nitrogen to remove solids and liquids collected from the stack gas by the beds.

15. The method as set forth in claim 10 where at least two series of sequential through the first catalytic bed, the second catalytic bed, and the third catalytic bed are provided in parallel so stack gas can be cleaned by the method through one series of beds while other series of the beds can be cleaned.

16. The method as set forth in claim 12 where first catalytic bed, second catalytic bed, and third catalytic bed can be purged with liquid nitrogen to remove solids and liquids collected from the stack gas by the beds.

17. The method as set forth in claim 10 comprising in addition a fourth catalytic flow-through bed of calcium zeolite comprising zeolite particles between 44 µm and 64 µm in size positioned in the stack before the first catalytic bed with an electrical charge beneath said fourth catalytic flow-through bed to collect aluminum compounds from the stack gases before passing through the first catalytic bed.

18. The method as set forth in claim 10 where the fourth catalytic flow-through bed is on a rotating disk so the stack gases are continuously move through the fourth bed while other portions of the same beds or a like bed are purged with nitrogen to remove solids and liquids collected from the stack gas by the fourth bed.

19. The method as set forth in claim 18 where the nitrogen is liquid nitrogen.

20. The method as set forth in claim 10 where the stack gases exiting from third catalytic bed through the stack have at least 95% reduction in sulfur oxides, nitrogen oxides and carbon oxide compared to the stack gases delivered to the a first catalytic flow-through bed.

21. The method as set forth in claim 17 where the stack gases exiting from third catalytic bed through the stack have at least 95% reduction in aluminum compounds, sulfur oxides, nitrogen oxides, and carbon oxide compared to the stack gases delivered through the stack to the fourth catalytic flow-through bed.

22. The method as set forth in claim 10 where the stack gases exiting a stack from the third catalytic bed through the stack is at least 99% reduction in sulfur oxides, nitrogen oxides, and carbon oxide compared to the stack gases delivered through the stack to the a first catalytic flow-through bed.

23. The method as set forth in claim 17 where the gases exiting a stack from the third catalytic bed is at least 99% reduction in aluminum compounds, sulfur oxides, nitrogen oxides, and carbon oxide compared to the stack gases delivered through the stack to the fourth catalytic flow-through bed.

24. A method of cleaning sulfur oxides from stack gases comprising the steps of:
  (a) providing in a stack adapted to pass stack gas a catalytic flow-through bed of calcium zeolite comprising zeolite particles of a majority between 78 µm and 204 µm adapted to reduce sulfur oxides in the stack gases,
  (b) passing stack gases selected from the group consisting of volatiles from combustion of coal or from combustion of natural gas or from a cement kiln sequential through the catalytic flow-through bed collecting solids in the catalytic bed and providing gas exiting the catalytic bed with at least 90% reduction in sulfur oxides, and
  (c) purging solids and liquids from the catalytic flow-through bed by intermittently passing nitrogen through the beds to remove solids and liquids collected from the stack gases by the bed.

25. The method as set forth in claim 24 where the catalytic flow-through bed is positioned between screens each of between 150 and 350 mesh.

26. The method as set forth in claim 24 where the catalytic flow-through bed is intermittently purged with liquid nitrogen to remove solids and liquids collected from the stack gases by the beds.

27. The method as set forth in claim 24 where the catalytic flow-through bed is provided on a rotating disk.

28. The method as set forth in claim 24 where the catalytic flow-through bed is provided on a rotating disk such that the stack gases in step (b) can be continuously passed through the catalytic bed to provide collection of solids and liquids from the stack gases while other portions of the same beds or like beds are purged with nitrogen to remove solids and liquids collected from the stack gas by the bed.

29. The method as set forth in claim 24 where at least two series of sequential through the first catalytic bed, the second catalytic bed, and the third catalytic bed are provided in parallel so stack gas can be cleaned by the method through one series of beds while other series of the beds can be cleaned.

30. The method as set forth in claim 28 where the catalytic flow-through bed is purged with liquid nitrogen to remove solids and liquids collected by the beds from the stack gas.

31. The method as set forth in claim 28 where the catalytic flow-through bed is purged with liquid nitrogen to remove solids and liquids collected by the beds from the stack gas.

32. The method as set forth in claim 24 comprising in addition another catalytic flow-through bed of calcium zeolite comprising zeolite particles between 44 µm and 64 µm in size positioned in the stack before said first stated catalytic bed with an electrical charge beneath said another catalytic flow-through bed to collect aluminum compounds from the stack gases before passing through the first stated catalytic bed.

33. The method as set forth in claim 32 where said another catalytic flow-through bed is on a rotating disk so the stack gases are continuously moved through that bed while other portions of the same bed or a like bed are purged with nitrogen to remove solids and liquids collected from the stack gas by the bed.

34. The method as set forth in claim 32 where at least two series of sequential through the first catalytic bed, the second catalytic bed, and the third catalytic bed are provided in parallel so stack gas can be cleaned by the method through one series of beds while other series of the beds can be cleaned.

35. The method as set forth in claim 33 where the nitrogen is liquid nitrogen.

36. The method as set forth in claim 34 where the nitrogen is liquid nitrogen.

37. The method as set forth in claim 24 where the stack gases exiting from catalytic flow-through bed through the stack have at least 95% reduction in sulfur oxides compared to the stack gases delivered to the a first catalytic flow-through bed.

38. The method as set forth in claim 32 where the stack gases exiting from said catalytic flow-through beds through the stack have at least 95% reduction in aluminum compounds and sulfur oxides compared to the stack gases delivered through the stack to the other catalytic flow-through beds.

39. The method as set forth in claim 24 where the stack gases exiting from catalytic flow-through bed through the stack have at least 99% reduction in sulfur oxides compared to the stack gases delivered through the stack to the a first catalytic flow-through bed.

40. The method as set forth in claim 32 where the stack gases exiting from said catalytic flow-through beds through the stack have at least 99% reduction in aluminum compounds and sulfur oxides compared to the stack gases delivered through the stack to the catalytic flow-through beds.

41. Apparatus of cleaning carbon oxides, sulfur oxides, and nitrogen oxides from stack gases comprising:
  (a) assembling an stack adapted to pass stack gases selected from the group consisting of gases from combustion of coal or from combustion of natural gas or propane or from a cement kiln, (b) assembling in the stack adapted to pass stack gases a first catalytic flow-through bed of calcium zeolite comprising zeolite particles of a majority between 44 μm and 64 μm in size adapted to reduce carbon oxide from the stack gases, (b) assembling in the stack adapted to pass stack gases positioned adjacent the first catalytic flow-through bed, a second catalytic flow-through bed of a blend between 25 and 75% of sodium zeolite and calcium zeolite comprising zeolite particles of a majority between 65 μm and 125 μm in size adapted to reduce nitrogen oxides from the stack gases, (c) assembling in the stack adapted to pass stack gas positioned adjacent the second catalytic flow-through bed, a third catalytic flow-through bed of calcium zeolite comprising zeolite particles of a majority between 78 μm and 204 μm adapted to reduce sulfur oxides in the stack gases, and (d) such that the first catalytic bed, the second catalytic bed, and the third catalytic bed are adapted to collect solids and liquids in the catalytic beds so that stack gases exiting the third catalytic bed have at least at least 90% reduction in sulfur oxides, nitrogen oxides, and carbon oxide compared to the stack gases delivered to the a first catalytic flow-through bed.

42. The apparatus of cleaning carbon oxides, sulfur oxides, and nitrogen oxides from stack gases as claimed in claim 40 where the first catalytic bed, the second catalytic bed and the third catalytic bed are each assembled between screens each of between 150 and 350 mesh.

43. The apparatus of cleaning carbon oxides, sulfur oxides, and nitrogen oxides from stack gases as claimed in claim 40 where the first catalytic bed, the second catalytic bed, and the third catalytic bed are each assembled on a rotating disk.

44. The apparatus of cleaning carbon oxides, sulfur oxides, and nitrogen oxides from stack gases as claimed in claim 40 where at least two series of sequential through the first catalytic bed, the second catalytic bed, and the third catalytic bed are assembled in parallel so stack gas can be cleaned through one series of beds while at least one other series of the beds can be cleaned.

45. The apparatus of cleaning carbon oxides, sulfur oxides, and nitrogen oxides from stack gases as claimed in claim 40 where in addition a fourth catalytic flow-through bed of calcium zeolite comprising zeolite particles between 44 μm and 64 μm in size is positioned in the stack before the first catalytic bed with an electrical charge beneath said fourth catalytic flow-through bed to collect aluminum compounds from the stack gases before passing through the first catalytic bed.

46. The apparatus of cleaning carbon oxides, sulfur oxides, and nitrogen oxides from stack gases as claimed in claim 40 where the first catalytic bed, the second catalytic bed, and the third catalytic bed are adapted to collect solids in the catalytic beds so that stack gases exiting the third catalytic have at least at least 95% reduction in sulfur oxides, nitrogen oxides, and carbon oxides compared to the stack gases delivered to the a first catalytic flow-through bed through the stack.

47. The apparatus of cleaning aluminum oxide, carbon oxides, sulfur oxides, and nitrogen oxides from stack gases as claimed in claim 45 where the first catalytic bed, the second catalytic bed, the third catalytic bed and the fourth catalytic bed are adapted to collect solids in the catalytic beds so that stack gases exiting the third catalytic have at least at least 95% reduction in aluminum oxides, sulfur oxides, nitrogen oxides, and carbon oxides compared to the stack gases delivered to the series of catalytic flow-through bed through the stack.

48. The apparatus of cleaning carbon oxides, sulfur oxides, nitrogen oxides and other pollutants from stack gases as claimed in claim 40 where the first catalytic bed, the second catalytic bed, and the third catalytic bed are adapted to collect solids in the catalytic beds so that stack gases exiting the third catalytic have at least at least 99% reduction in sulfur oxides, nitrogen oxides and carbon oxide compared to the stack gases delivered to the a first catalytic flow-through bed through the stack.

49. Apparatus of cleaning carbon oxides, sulfur oxides, and nitrogen oxides from stack gases comprising:

(a) assembling an stack adapted to pass stack gases selected from the group consisting of volatiles from combustion of coal or from combustion of natural gas or propane or from a cement kiln, (b) assembling in the stack adapted to pass stack gases through a first catalytic flow-through bed of calcium zeolite comprising zeolite particles of a majority between 44 μm and 64 μm in size adapted to reduce carbon oxides, aluminum oxide, and methane gas from the stack gases, (b) assembling in the stack adapted to pass stack gases positioned adjacent the first catalytic flow-through bed, a second catalytic flow-through bed of a blend between 25 and 75% of sodium zeolite and calcium zeolite comprising zeolite particles of a majority between 65 μm and 125 μm in size adapted to reduce nitrogen oxides from the stack gases, (c) assembling in the stack adapted to pass stack gas positioned adjacent the second catalytic flow-through bed, a third catalytic flow-through bed of calcium zeolite comprising zeolite particles of a majority between 78 μm and 204 μm adapted to reduce sulfur oxides in the stack gases, and (d) such that the first catalytic bed, the second catalytic bed, and the third catalytic bed adapted to collect solids in the catalytic beds so that stack gases exiting the third catalytic have at least at least 90% reduction in sulfur oxides, nitrogen oxides, and carbon oxide, and (e) an input to intermittently purge first catalytic bed, the second catalytic bed, and the third catalytic bed with nitrogen to remove liquids and solids collected in the first catalytic bed, the second catalytic bed, and the third catalytic bed.

50. The apparatus of cleaning carbon oxides, sulfur oxides, and nitrogen oxides from stack gases as claimed in claim 49 where the first catalytic bed, the second catalytic bed and the third catalytic bed are each assembled between screens each of between 150 and 350 mesh.

51. The apparatus of cleaning carbon oxides, sulfur oxides, and nitrogen oxides from stack gases as claimed in claim 49 where the first catalytic bed, the second catalytic bed, and the third catalytic bed are each assembled on a rotating disk such that stack gases can be continuously passed through a first catalytic bed, a second catalytic bed, and a third catalytic bed to provide collection of solids and liquids from the stack gases while other portions of the same beds or like beds are purged with nitrogen to remove solids and liquids collected from the stack gas by the beds.

52. The apparatus of cleaning carbon oxides, sulfur oxides, and nitrogen oxides from stack gases as claimed in claim 49 where at least two series of sequential through the first catalytic bed, the second catalytic bed, and the third catalytic bed are assembled in parallel so stack gas can be cleaned through one series of beds while at least one other series of the beds can be cleaned.

53. The apparatus of cleaning carbon oxides, sulfur oxides, and nitrogen oxides from stack gases as claimed in claim 49 where input of purge nitrogen is liquid nitrogen.

54. The apparatus of cleaning carbon oxides, sulfur oxides, and nitrogen oxides from stack gases as claimed in claim 51 where input of purge nitrogen is liquid nitrogen.

55. The apparatus of cleaning carbon oxides, sulfur oxides, and nitrogen oxides from stack gases as claimed in claim 52 where input of purge nitrogen is liquid nitrogen.

56. The apparatus of cleaning carbon oxides, sulfur oxides, nitrogen oxides and other pollutants from stack gases as claimed in claim 49 where in addition a fourth catalytic flow-through bed of calcium zeolite comprising zeolite particles between 44 µm and 64 µm in size is positioned in the stack before the first catalytic bed with an electrical charge beneath said fourth catalytic flow-through bed to collect aluminum compounds from the stack gases before passing through the first catalytic bed.

57. The apparatus of cleaning carbon oxides, sulfur oxides, and nitrogen oxides from stack gases as claimed in claim 49 where the fourth catalytic flow-through bed is on a rotating disk such that stack gases can be continuously passed through a fourth catalytic bed to provide collection of aluminum oxides from the stack gases while other portions of the same beds or like beds are purged with nitrogen to remove aluminum oxides collected from the stack gas by the fourth catalytic flow-through bed.

58. The apparatus of cleaning carbon oxides, sulfur oxides, and nitrogen oxides from stack gases as claimed in claim 49 where the first catalytic bed, the second catalytic bed, and the third catalytic bed are adapted to collect solids in the catalytic beds so that stack gases exiting the third catalytic have at least at least 95% reduction in sulfur oxides, nitrogen oxides, and carbon oxide compared to the stack gases delivered to the a first catalytic flow-through bed through the stack.

59. The apparatus of cleaning aluminum oxides, carbon oxides, sulfur oxides, nitrogen oxides and other pollutants from stack gases as claimed in claim 57 where the first catalytic bed, the second catalytic bed, and the third catalytic bed are adapted to collect solids in the catalytic beds so that stack gases exiting the third catalytic have at least at least 95% reduction in sulfur oxides, nitrogen oxides, and carbon oxide compared to the stack gases delivered to the fourth catalytic flow-through bed through the stack.

60. The apparatus of cleaning carbon oxides, sulfur oxides, and nitrogen oxides from stack gases as claimed in claim 49 where the first catalytic bed, the second catalytic bed, and the third catalytic bed are adapted to collect solids in the catalytic beds so that stack gases exiting the third catalytic have at least at least 99% reduction in sulfur oxides, nitrogen oxides, and carbon oxide compared to the stack gases delivered to the a first catalytic flow-through bed through the stack.

61. The apparatus of cleaning aluminum oxide, carbon oxides, sulfur oxides, nitrogen oxides and other pollutants from stack gases as claimed in claim 57 where the first catalytic bed, the second catalytic bed, and the third catalytic bed are adapted to collect solids in the catalytic beds so that stack gases exiting the third catalytic have at least at least 99% reduction in sulfur oxides, nitrogen oxides, and carbon oxide compared to the stack gases delivered to the fourth catalytic flow-through bed through the stack.

62. Apparatus of cleaning sulfur oxides from stack gases comprising:
  (a) assembling an stack adapted to pass stack gases selected from the group consisting of volatiles from combustion of coal or from combustion of natural gas or propane or from a cement kiln,
  (b) assembling in the stack adapted to pass stack gas through positioned adjacent the second catalytic flow-through bed, a catalytic flow-through bed of calcium zeolite comprising zeolite particles of a majority between 78 µm and 204 µm adapted to reduce sulfur oxides in the stack gases, and
  (d) such that the catalytic flow-through bed is adapted to collect solids from such stack gases exiting the catalytic flow-through bed have at least at least 90% reduction in sulfur oxides compared to the stack gases delivered to the catalytic flow-through bed through the stack.

63. The apparatus of cleaning sulfur oxides from stack gases as claimed in claim 62 where the catalytic flow-through bed are each assembled between screens of between 150 and 350 mesh.

64. The apparatus of cleaning sulfur oxides from stack gases as claimed in claim 62 where the catalytic flow-through bed is assembled on a rotating disk.

65. The apparatus of cleaning sulfur oxides from stack gases as claimed in claim 62 where at least two catalytic beds are assembled in parallel so stack gas can be cleaned through one of catalytic beds while at least one other of the beds can be cleaned.

66. The apparatus of cleaning sulfur oxides from stack gases as claimed in claim 62 where an addition another catalytic flow-through bed of calcium zeolite comprising zeolite particles between 44 µm and 64 µm in size is positioned in the stack before said first stated catalytic bed with an electrical charge beneath said other catalytic flow-through bed to collect aluminum compounds from the stack gases before passing through the first stated catalytic bed.

67. The apparatus of sulfur oxides from stack gases as claimed in claim 62 where the first stated catalytic bed collects solids so that stack gases exiting the catalytic bed provides at least 95% reduction in sulfur oxides compared to the stack gases delivered to the catalytic flow-through bed through the stack.

68. The apparatus of cleaning sulfur oxides from stack gases as claimed in claim 62 where the catalytic flow provides at least at least 99% reduction in sulfur oxides compared to the stack gases delivered to the catalytic flow-through bed through the stack.

69. Apparatus of cleaning sulfur oxides from stack gases comprising:
  (a) assembling an stack adapted to pass stack gases selected from the group consisting of volatiles from combustion of coal or from combustion of natural gas or propane or from a cement kiln,
  (b) assembling in the stack adapted to pass stack gas positioned adjacent the second catalytic flow-through bed, a catalytic flow-through bed of calcium zeolite comprising zeolite particles of a majority between 78 µm and 204 µm adapted to reduce sulfur oxides in the stack gases, and
  (d) such that the catalytic flow-through bed is adapted to collect solids and liquids from such stack gases exiting the catalytic flow-through bed have at least at least 90% reduction in sulfur oxides compared to the stack gases delivered to the catalytic flow-through bed through the stack;
  (e) a input provides nitrogen to intermittently purge the catalytic flow-through bed with nitrogen to remove sulfur compounds collected on the catalytic flow-though bed.

70. The apparatus of cleaning sulfur oxides from stack gases as claimed in claim 69 where the catalytic flow-through bed is assembled on a rotating disk such that stack gases can be continuously passed through a catalytic flow-through bed to provide collection of sulfur oxide compounds from the stack gases while other portions of the same beds or like beds are purged with nitrogen to remove sulfur compounds collected from the stack gas by the bed.

71. The apparatus of cleaning sulfur oxides from stack gases as claimed in claim 69 where the catalytic flow-through bed are each assembled between screens of between 150 and 350 mesh.

72. The apparatus of cleaning sulfur oxides from stack gases as claimed in claim 69 where the catalytic flow-through bed is assembled on a rotating disk.

73. The apparatus of cleaning sulfur oxides from stack gases as claimed in claim 69 where in addition another catalytic flow-through bed of calcium zeolite comprising zeolite particles between 44 μm and 64 μm in size is positioned in the stack before said first stated catalytic bed with an electrical charge beneath said other catalytic flow-through bed to collect aluminum compounds from the stack gases before passing through the first stated catalytic bed.

74. The apparatus of sulfur oxides from stack gases as claimed in claim 69 where the first stated catalytic bed collects solids so that stack gases exiting the catalytic bed provides at least 95% reduction in sulfur oxides compared to the stack gases delivered to the catalytic flow-through bed through the stack.

75. The apparatus of cleaning sulfur oxides from stack gases as claimed in claim 69 where the catalytic flow provides at least at least 99% reduction in sulfur oxides compared to the stack gases delivered to the catalytic flow-through bed through the stack compared to the stack gases delivered to the catalytic flow-through bed through the stack.

76. A fertilizer product produced by the steps of:
   (a) providing in a stack adapted to pass stack gases through a first catalytic flow-through bed of calcium zeolite comprising zeolite particles of a majority between 44 μm and 64 μm in size adapted to reduce carbon oxides from the stack gases,
   (b) providing in the stack adapted to pass stack gases positioned adjacent the first catalytic flow-through bed, a second catalytic flow-through bed of a blend between 25 and 75% of sodium zeolite and calcium zeolite comprising zeolite particles of a majority between 65 μm and 125 μm in size adapted to reduce nitrogen oxides from the stack gases,
   (c) providing in the stack adapted to pass stack gas positioned adjacent the second catalytic flow-through bed, a third catalytic flow-through bed of calcium zeolite comprising zeolite particles of a majority between 78 μm and 204 μm adapted to reduce sulfur oxides in the stack gases,
   (d) passing stack gases selected from the group consisting of volatiles from combustion of coal or from combustion of natural gas or propane or from a cement kiln sequential through the first catalytic bed, the second catalytic bed, and the third catalytic bed each collecting solids in the catalytic beds and providing gas exiting the third catalytic bed with at least 90% reduction in sulfur oxides, nitrogen oxides, and carbon oxide compared to the stack gases delivered to the catalytic flow-through bed through the stack,
   (e) purging solids and liquids from the first catalytic bed, the second catalytic bed, and the third catalytic bed by intermittently passing nitrogen through the beds to remove solids and liquids collected from the stack gases by the beds.

77. The fertilizer product as set forth in claim 76 where first catalytic bed, second catalytic bed, and third catalytic bed are purged with liquid nitrogen to remove solids and liquids collected from the stack gases by the beds.

78. The fertilizer product as set forth in claim 76 where the first catalytic bed, the second catalytic bed, and the third catalytic bed are each provided on a rotating disk such that the stack gases in step (d) can be continuously passed through a first catalytic bed, a second catalytic bed, and a third catalytic bed to provide collection of solids and liquids from the stack gases while other portions of the same beds or like beds are purged with nitrogen to remove solids and liquids collected from the stack gas by the beds.

79. The fertilizer product as set forth in claim 78 where first catalytic bed, second catalytic bed, and third catalytic bed can be purged with liquid nitrogen to remove solids and liquids collected from the stack gas by the beds.

80. The fertilizer product as set forth in claim 76 comprising in addition a fourth catalytic flow-through bed of calcium zeolite comprising zeolite particles between 44 μm and 64 μm in size positioned in the stack before the first catalytic bed with an electrical charge beneath said fourth catalytic flow-through bed to collect aluminum compounds from the stack gases before passing through the first catalytic bed.

81. The fertilizer product as set forth in claim 80 where the fourth catalytic flow-through bed is on a rotating disk so the stack gases are continuously move through the fourth bed while other portions of the same beds or a like bed are purged with nitrogen to remove solids and liquids collected from the stack gas by the fourth bed.

\* \* \* \* \*